United States Patent
Fiedler et al.

(10) Patent No.: US 10,098,422 B2
(45) Date of Patent: Oct. 16, 2018

(54) MAGNETIC BAND DEVICE, IN PARTICULAR WRISTBAND

(71) Applicant: Fidlock GmbH, Hannover (DE)

(72) Inventors: Joachim Fiedler, Hannover (DE); Artur Tucholke, Hannover (DE); Breido Botkus, Kassel (DE)

(73) Assignee: Fidlock GmbH, Hannover (DE)

( * ) Notice: Subject to any disclaimer, the term of this patent is extended or adjusted under 35 U.S.C. 154(b) by 0 days.

(21) Appl. No.: 14/913,708

(22) PCT Filed: Aug. 26, 2013

(86) PCT No.: PCT/EP2013/067642
§ 371 (c)(1),
(2) Date: Feb. 23, 2016

(87) PCT Pub. No.: WO2015/028044
PCT Pub. Date: Mar. 5, 2015

(65) Prior Publication Data
US 2016/0198813 A1    Jul. 14, 2016

(51) Int. Cl.
*A44C 5/18* (2006.01)
*A44C 5/20* (2006.01)
*H04B 1/3827* (2015.01)
*A44C 5/00* (2006.01)
*A41F 1/00* (2006.01)

(52) U.S. Cl.
CPC .......... *A44C 5/2071* (2013.01); *A44C 5/0007* (2013.01); *A44C 5/2019* (2013.01); *H04B 1/385* (2013.01); *A41F 1/002* (2013.01); *A44D 2203/00* (2013.01); *H04B 2001/3861* (2013.01)

(58) Field of Classification Search
CPC ... A44C 5/2071; A44C 5/0007; A44C 5/2019; H04B 1/385; H04B 2001/3861; A41F 1/002; A44D 2203/00
See application file for complete search history.

(56) References Cited

U.S. PATENT DOCUMENTS 4,873,677 A    10/1989  Sakamoto et al.
4,941,236 A *  7/1990  Sherman .............. A44C 5/2071
                                              24/303

(Continued)

FOREIGN PATENT DOCUMENTS

DE    202011106267 U1    2/2012
WO    2005009167 A2     2/2005

*Primary Examiner* — Corey Skurdal
(74) *Attorney, Agent, or Firm* — The Webb Law firm

(57) ABSTRACT

A band device extends longitudinally along an extension direction and at least in sections is formed flexible for placing it around a user's limb. It comprises a first end having a first surface, a second end having a second surface, and a closure device for connecting the first end and the second end to each other such that the first end and the second end are held on each other in a closed position of the closure device, wherein in the closed position the first end with its first surface and the second end with its second surface extend along each other. The closure device comprises at least one engagement element arranged on the first end and at least one engagement opening arranged on the second end, wherein in the closed position of the closure device the at least one engagement element engages the at least one engagement opening.

17 Claims, 20 Drawing Sheets

(56) References Cited

U.S. PATENT DOCUMENTS

| | | | |
|---|---|---|---|
| 5,004,425 A | 4/1991 | Hee | |
| 5,664,298 A | 9/1997 | Nessar-Ivanovic | |
| 7,073,232 B1 * | 7/2006 | Fuhrman | A44C 5/2042 |
| | | | 24/303 |
| 7,496,994 B1 | 3/2009 | Headley | |
| 8,997,318 B2 * | 4/2015 | Nicolas | A44C 5/04 |
| | | | 24/265 WS |
| 2003/0099164 A1 | 5/2003 | Noirjean et al. | |
| 2003/0229974 A1 | 12/2003 | Zemer et al. | |
| 2004/0107547 A1 | 6/2004 | Chung | |
| 2005/0102802 A1 | 5/2005 | Sitbon et al. | |
| 2012/0044031 A1 | 2/2012 | Ninomiya | |
| 2012/0223673 A1 | 9/2012 | Chen et al. | |
| 2013/0097817 A1 | 4/2013 | Hayton | |
| 2016/0007697 A1 * | 1/2016 | de Jong | A44C 5/2071 |
| | | | 361/679.03 |

* cited by examiner

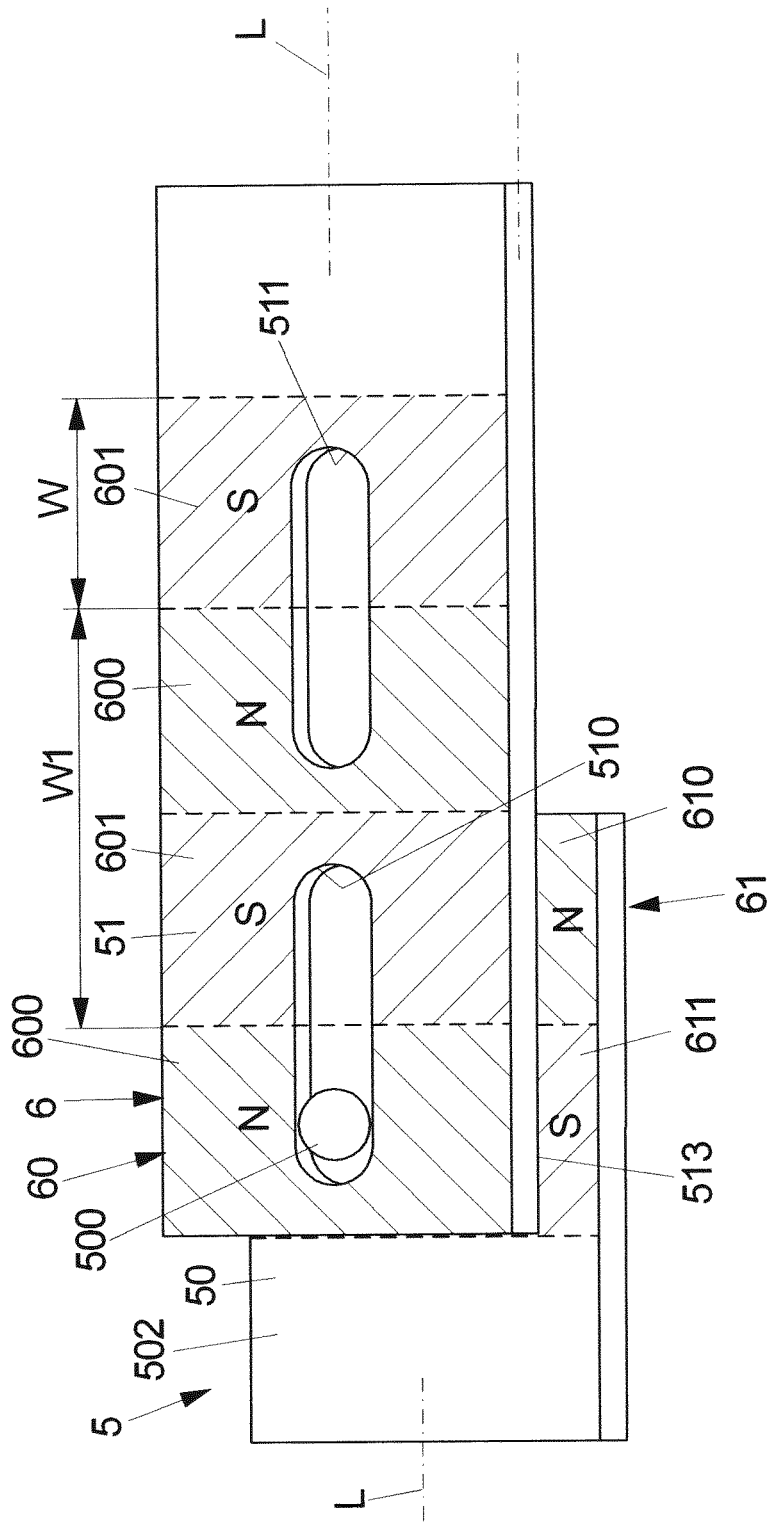

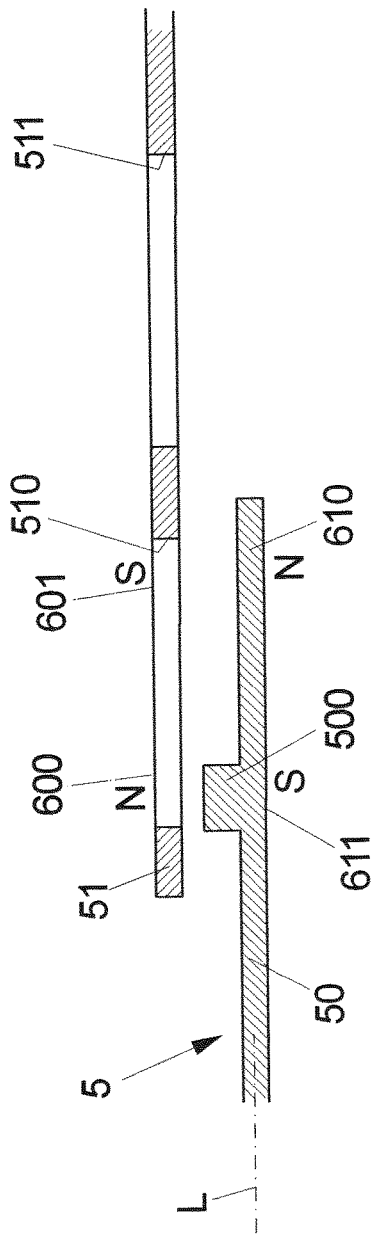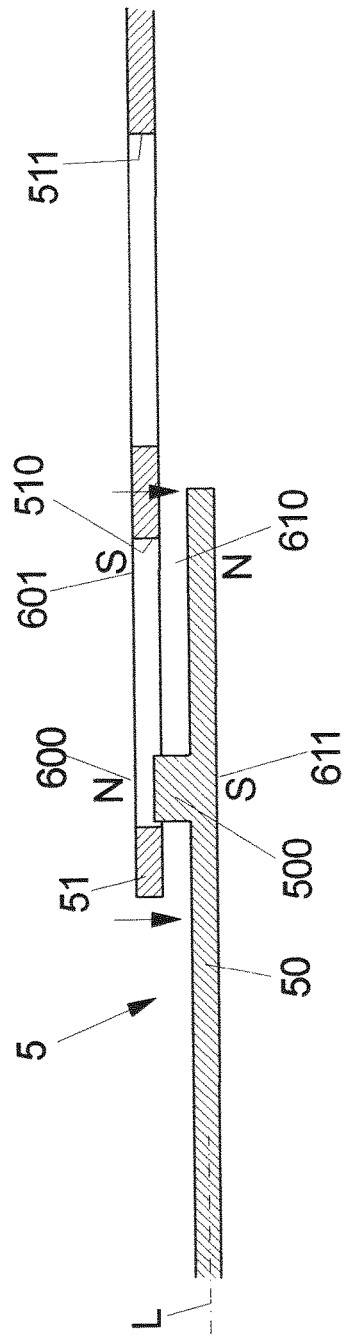

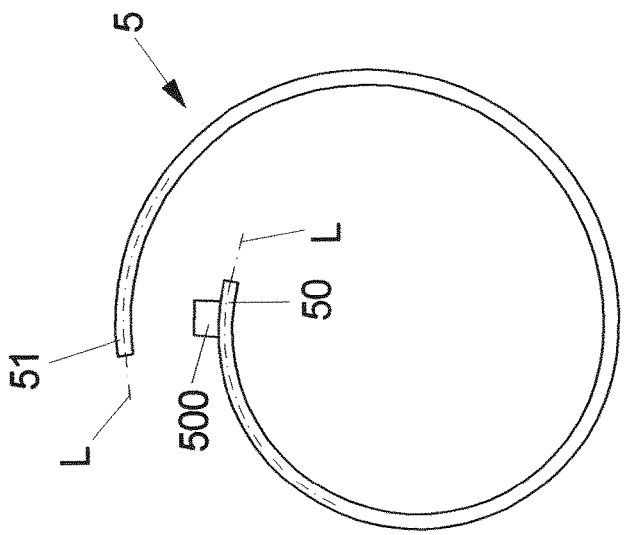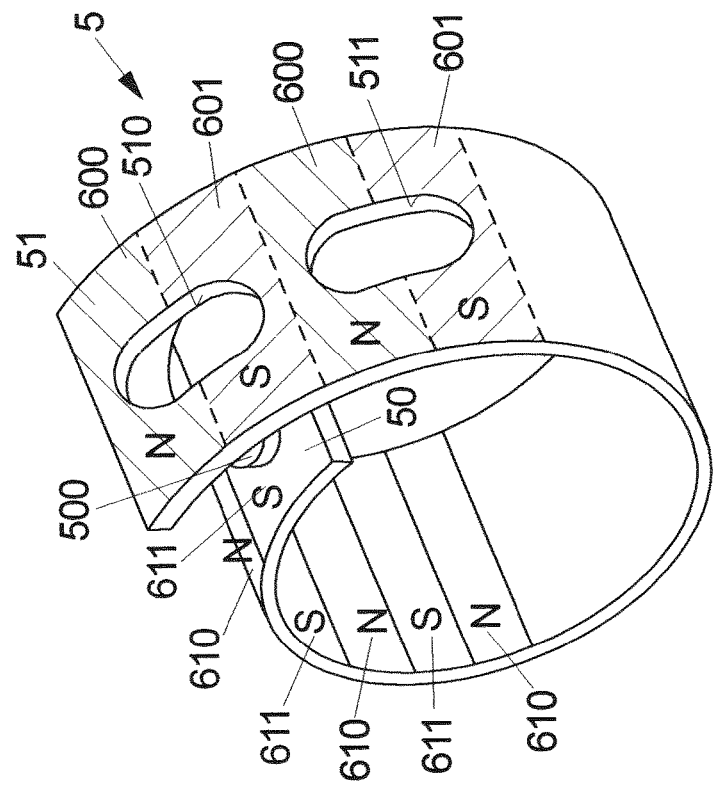

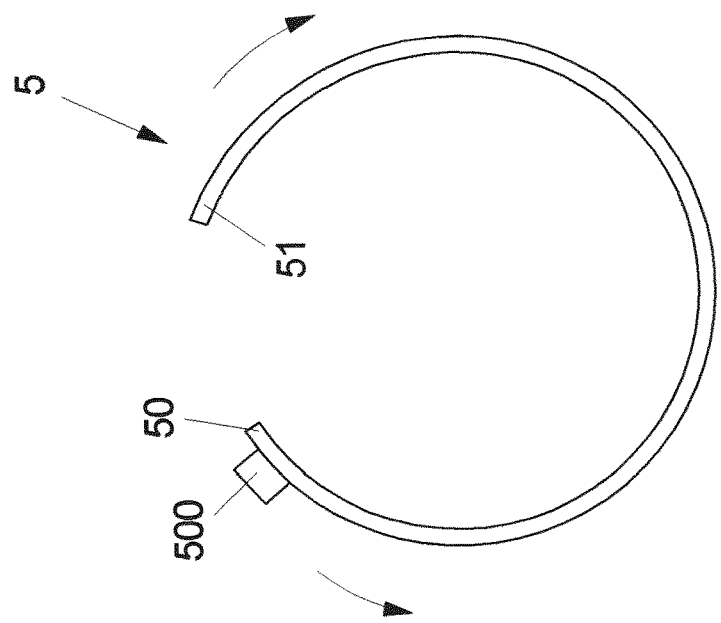
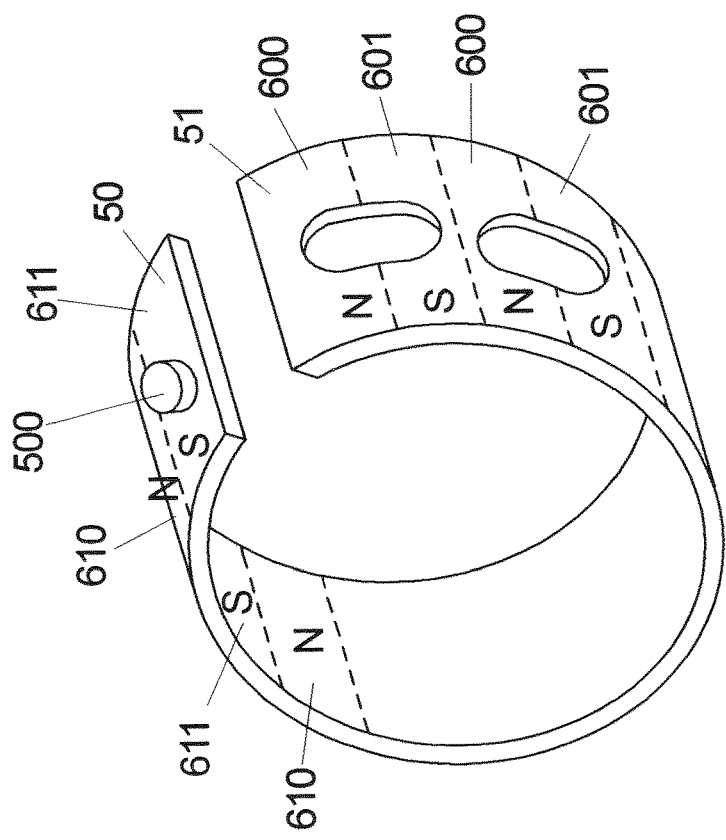
FIG 5B
FIG 5A

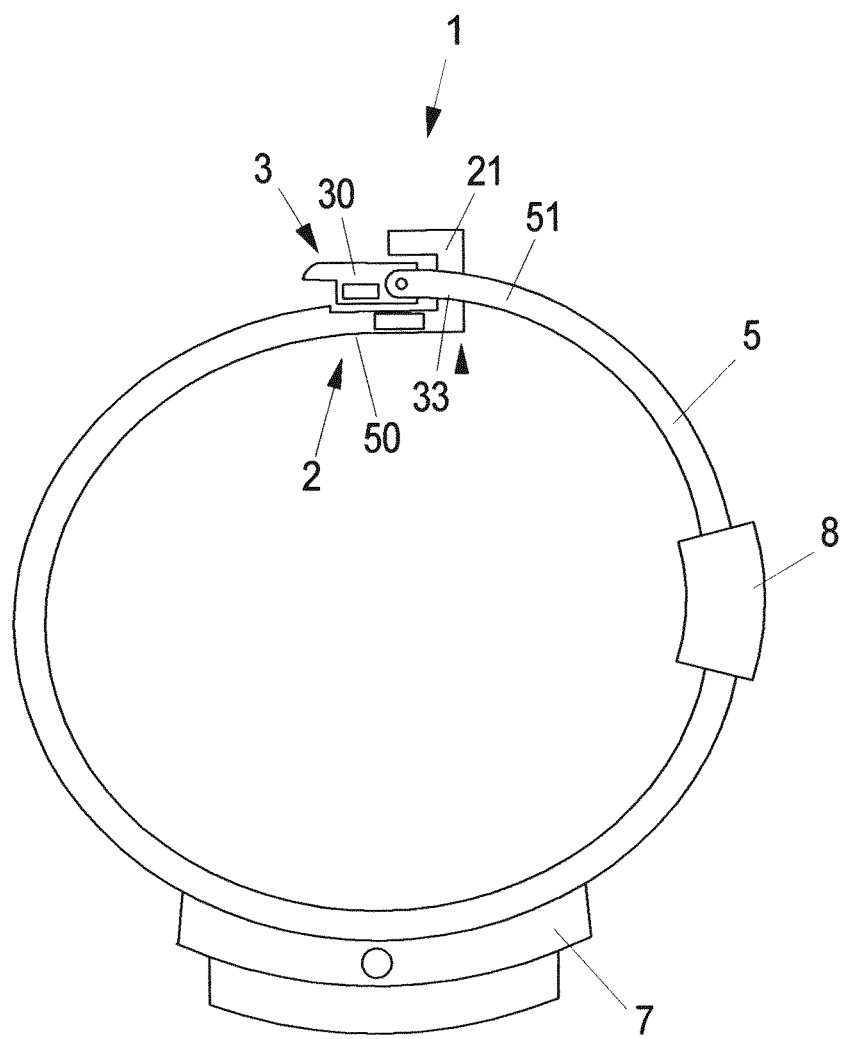

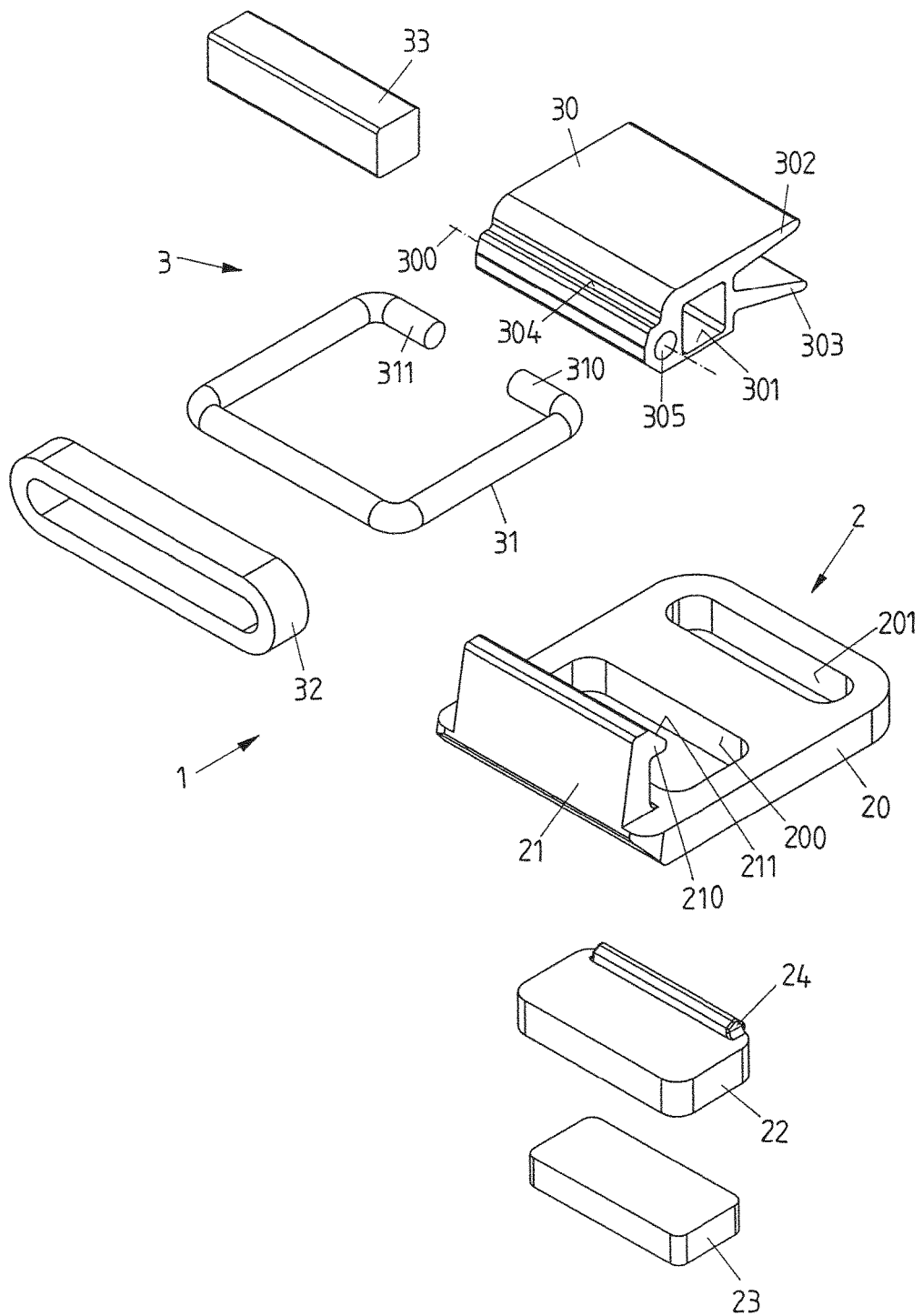

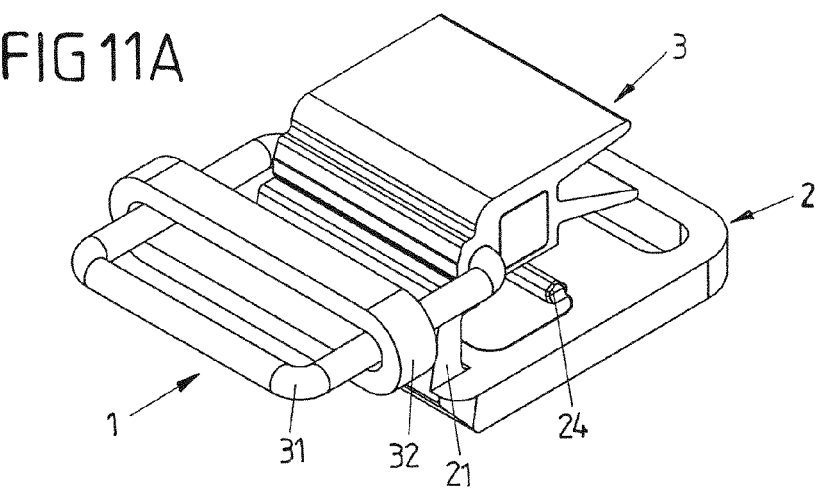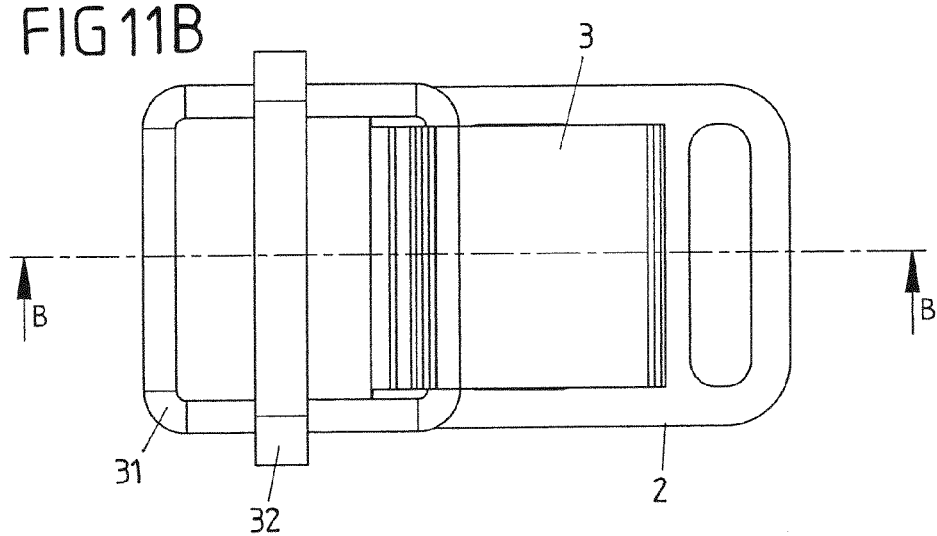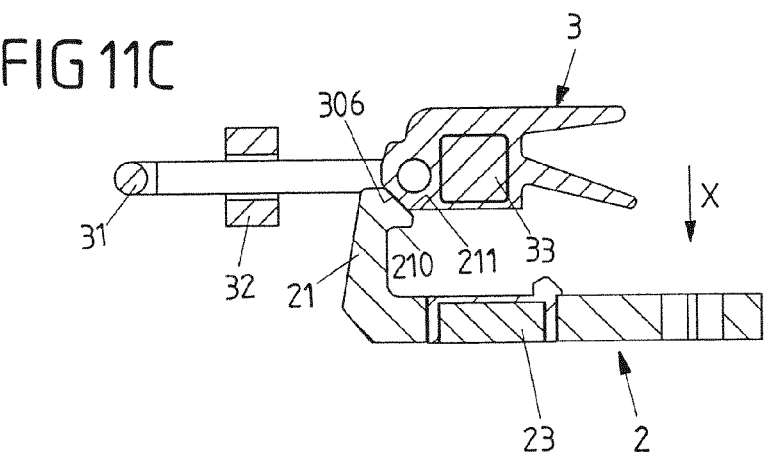

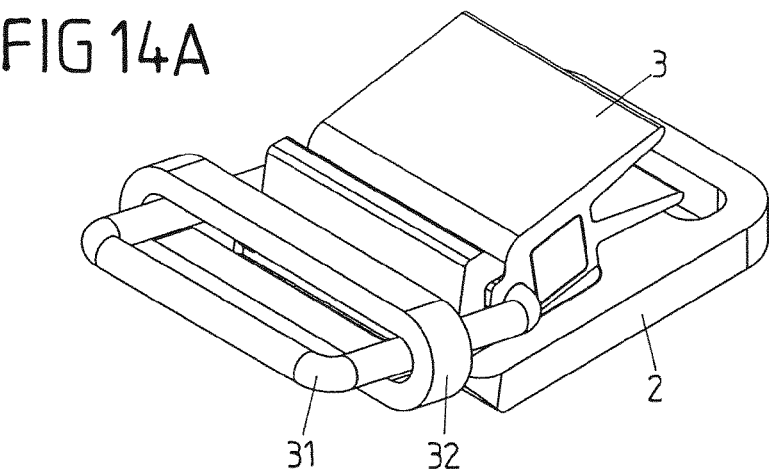
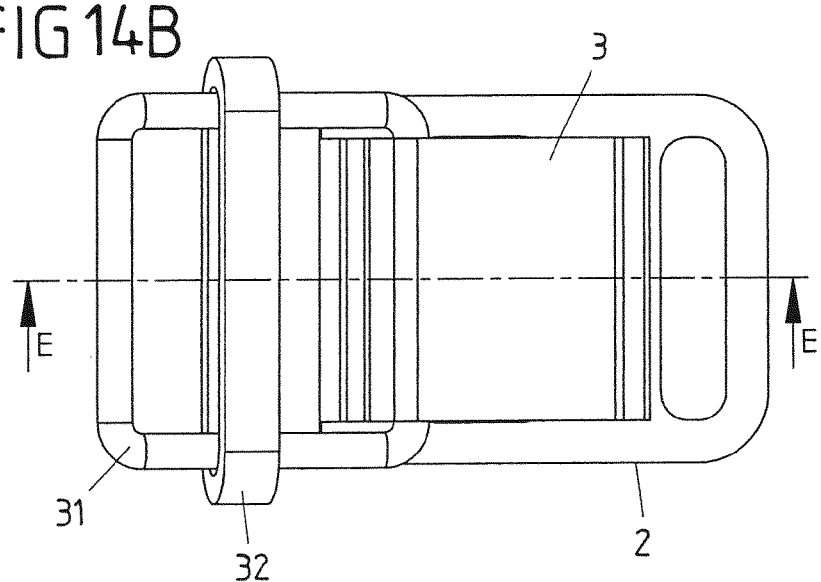
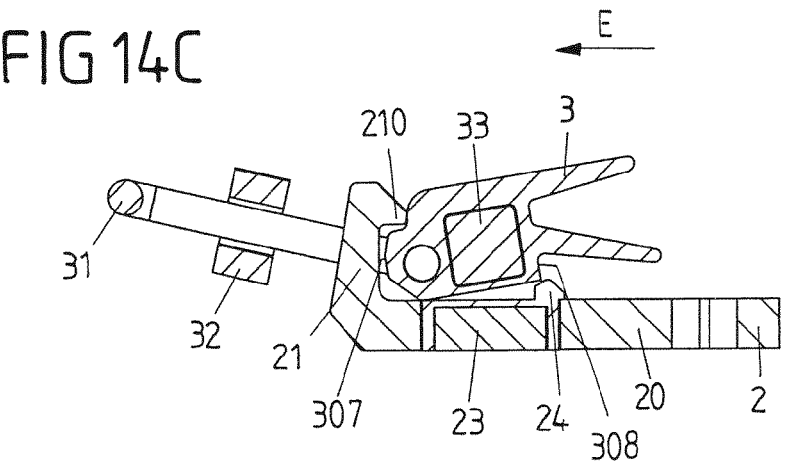

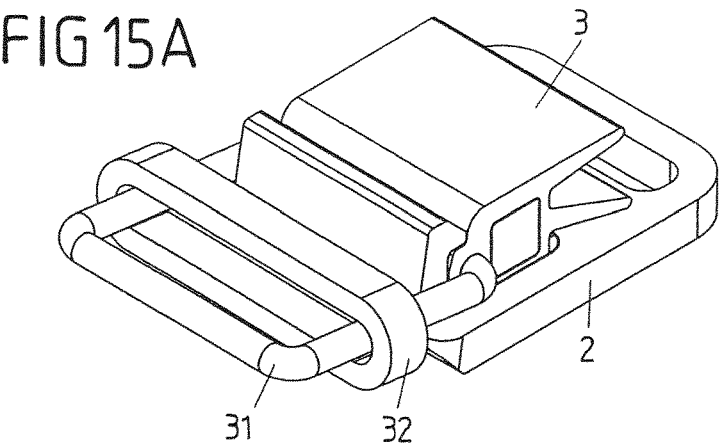
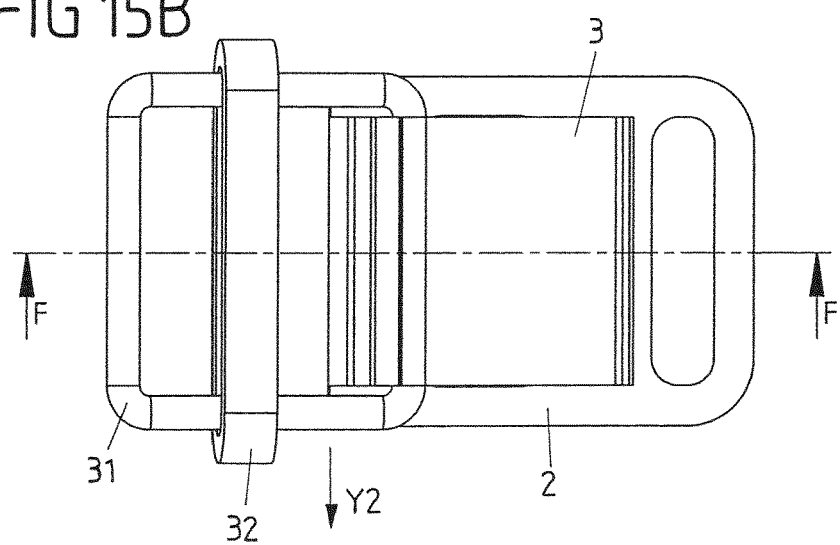
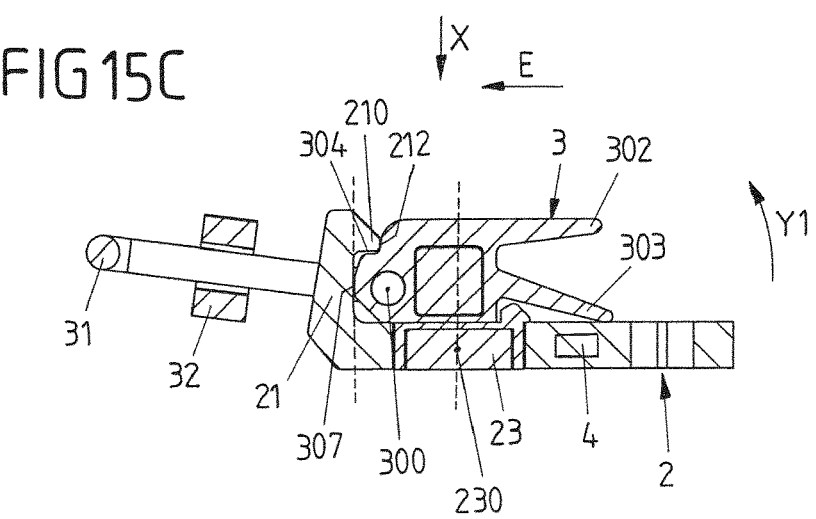

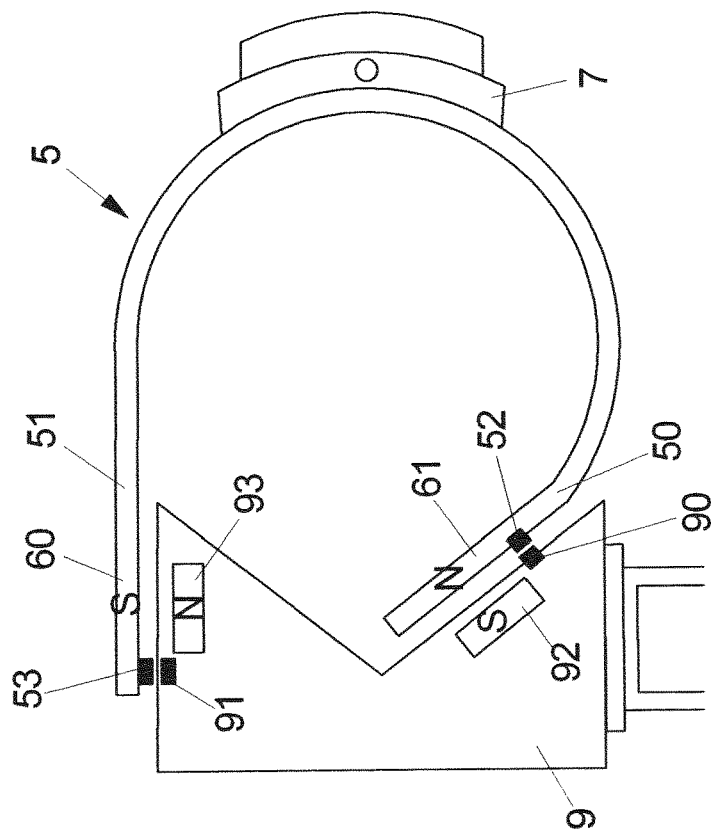
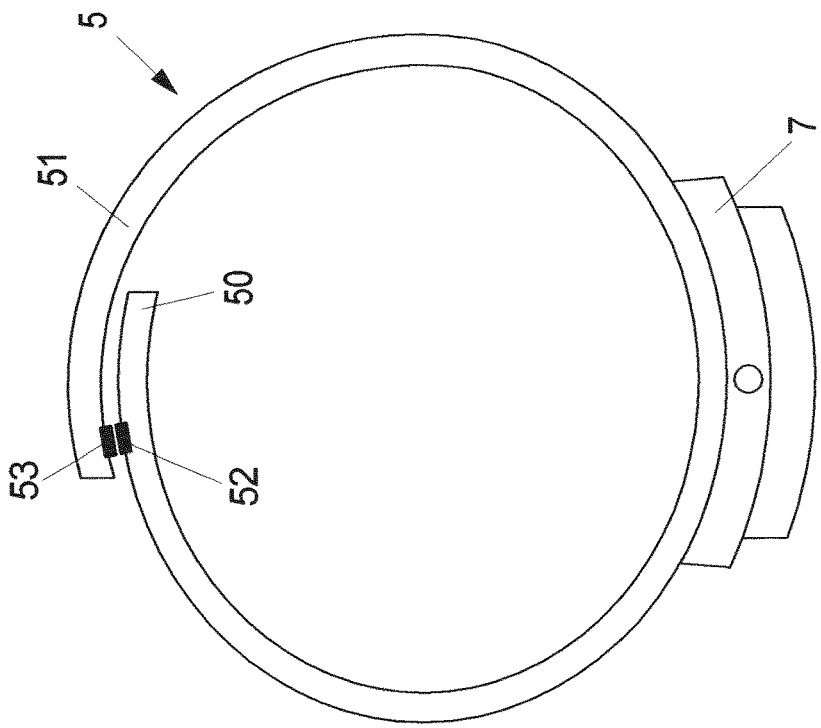

MAGNETIC BAND DEVICE, IN PARTICULAR WRISTBAND

CROSS-REFERENCE TO RELATED APPLICATIONS

This application is the United States national phase of International Application No. PCT/EP2013/067642 filed Aug. 26, 2013, the disclosure of which is hereby incorporated in its entirety by reference.

BACKGROUND OF THE INVENTION

The invention relates to a band device and an arrangement of an external electric device and a band device.

A band device of this kind may in particular be constituted as a wristband, but may also be constituted to be placed around another body part. The band device extends longitudinally along an extension direction and at least in sections is formed flexible such that it can be placed around a user's limb.

A band device of this kind comprises a first end having a first surface and a second end having a second surface. A closure device is provided for connecting the first end and the second end of the band device to each other such that the first end and the second end in a closed position of the closure device are held on each other. In the closed position the first end with its first surface and the second end with its second surface extend along each other. By closing the closure device the first end and the second end of the band device hence can be connected to each other such that the band device can be closed around a user's limb.

A band device of this kind may for example serve to carry a watch, a mobile computing device, a mobile phone or the like. By means of such a band device hence a watch, a mobile computing device, a mobile phone or the like may be fastened to a user's arm or wrist or another limb.

There is a desire for band devices of this kind which are easy and comfortable in their use in that they allow for an easy closing and easy opening of the band device for attaching the band device to a user's limb or for detaching the band device from the user's limb. The band device herein in a closed state shall safely be fastened such that it cannot be unintentionally opened without further ado. In particular, the band device shall ensure that a watch, a mobile computing device or a mobile phone fastened by means of the band device to a user's limb cannot be easily lost.

Because band devices of for example watches take part in the overall design and style of the watch, a closure device for fastening the ends of the band device to each other must fit into the style of the watch or must be at least integrateable into the band device in a way such that it does not deteriorate the outward appearance of the band device.

In a closure device as disclosed in U.S. Pat. No. 5,664,298 two closure members are provided which each comprise a locking protrusion. The locking protrusions can be brought into engagement with each other and, in a closed position of the closure device, are fittingly held together in a positive locking manner. Two magnets are arranged on each closure member to ensure that the closure members cannot be separated from each other in an unintentional manner. The closure device of U.S. Pat. No. 5,664,298 serves as a closure for jewelry.

In a closure device as known from US 2003/0229974 A1, also serving as a closure for jewelry, a first closure member can be brought into a positive locking engagement with a second closure member, wherein the engagement is secured, in a closed position of the closure device, by means of magnets.

From DE 20 2011 106 267 U1 a belt with a magnetic closure is known. The belt on one end carries a permanent magnet which in a closed position of the belt engages into an opening on another end of the belt.

SUMMARY OF THE INVENTION

It is an object of the instant invention to provide a band device which allows for a fastening of for example a watch, a mobile computing device, a mobile phone or the like to a user's limb and in this regard is comfortable in its use in that it can comfortably be closed around a user's limb and can also be comfortably opened. It also is an object of the invention to provide an arrangement of an external electric device and a band device with an electronic device arranged thereon allowing for an easy connection of the band device to the external electric device, for example a charging device or the like.

This object is achieved by a band device comprising the features as described herein.

Accordingly, the closure device comprises at least one engagement element arranged on the first end and at least one engagement opening arranged on the second end, wherein in the closed position of the closure device the at least one engagement element engages the at least one engagement opening, wherein at least one of the ends comprises a magnetic member comprising at least two magnet poles of opposite polarity, the at least two magnet poles being displaced with respect to each other along the associated first or second surface.

The engagement opening can be formed as a recess or a through-hole in the associated end.

The instant invention is based on the idea to provide a comfortable closure device for connecting two ends of the band device together. The band device herein is at least in sections flexible. This is to be understood to mean that the band device may be placed around a user's limb and may be deformed to detach the band device from the user's limb. The band device for example may be formed by a flexible strip of a flexible material such as cloth or plastics. The band device however may also be formed of rigid sections which are linked to each other to form a band which can be deformed to place it around a user's limb. In a particular example, the band device may comprise for example two rigid sections which are linked to each other and hence can be pivoted relative to each other such that the band device flexibly can be placed around a user's limb.

The instant invention is based on the idea to provide a closure device which on the one hand provides a mechanic fixing of the two ends of the band device to each other and on the other hand provides a magnetically supported closing of the band device. For this, one end of the band device carries at least one engagement element in the shape of a pin or hook, and the other end carries at least one engagement opening into which the at least one engagement element may engage in a positive locking manner. Furthermore, at least one of the ends comprises a magnetic member comprising at least two magnet poles of opposite polarity. Such two magnet poles herein are displaced with respect to each other along the plane in which the associated end of the band device extends. Namely, the two magnet poles are displaced along the surface defined by the end on which the at least two magnet poles are arranged. The magnet poles herein do not necessarily have to be placed immediately on the surface, but may also be located beneath the surface buried in the body of the band device.

In a preferred embodiment, both the first end and the second end carry a magnetic member. In particular, a first magnetic member is arranged on the first end and a second magnetic member is arranged on the second end, wherein the first magnetic member and the second magnetic member each comprise at least two magnet poles of opposite polarity, the at least two magnet poles being displaced with respect to each other along the associated first or second surface.

In an alternative embodiment it however is also possible that only one of the ends carries a magnetic member having two magnet poles of opposite polarity. In that case the other end for example may carry a magnetic element in the shape of a single magnet or a magnetic armature formed by a ferromagnetic material which by itself is not magnetized, but in interaction with the magnetic member of the other end produces a magnetic attraction force for attracting the first end and the second end of the band device towards each other.

In a particular embodiment, the at least two magnet poles of the magnetic member are displaced with respect to each other along the extension direction of the band device. Hence, the at least two magnet poles adjoin each other along the extension direction.

In a further embodiment, the magnetic member may comprise a multiplicity of magnet poles, namely more than two magnet poles, which are displaced with respect to each other and are arranged to form a periodic sequence of a pattern of magnet poles. Such periodic sequence may for example be formed such that, for example along the longitudinal extension direction of the band device, a north pole (N) is followed by a south pole (S) which again is followed by a north pole (N) such that a sequence NSNSNS . . . of magnet poles arises. It, however, is also possible that the magnet poles are arranged to form a periodic sequence which does not comprise only alternating poles. For example, a pattern of two north poles and one south pole (NNS) may be periodically arranged to form a sequence NNSNNSNNS . . . Other periodic sequences of course are also possible.

With the help of the at least one magnetic member arranged on one end of the band device and interacting with a magnetic armature or another magnetic member on the other end of the band device the closing of the band device may be simplified and made comfortable in that when closing the band device the ends of the band device are attracted to each other such that they in an easy way can be attached to each other by bringing the at least one engagement element of the one end into engagement with the at least one engagement opening on the other end. Herein, the magnet poles of the magnetic member may serve to ensure that the ends are placed on each other in a position in which the engagement element and the engagement opening can mechanically engage.

If a magnetic member having at least two magnet poles of opposite polarity is arranged on each of the ends of the band device, the ends can be placed on each other for closing the band device, wherein due to a magnetic attraction force the ends are attracted with respect to each other and are pulled towards each other into a position in which they engage each other by means of the engagement element and the engagement opening which for example may be formed by a longitudinally extending hole or recess. For opening the band device the ends can then be displaced with respect to each other along the extension direction such that the magnet poles of the two ends of the band device are moved with respect to each other and poles of equal polarity on the two ends are approached. This causes at least a weakening of the magnetic attraction force or even a magnetic repulsion force between the magnetic members of the two ends such that the ends of the band device can easily be removed from each other for opening the band device.

The magnetic member of the first end and/or the magnetic member of the second end are formed for example by discrete magnets forming a magnet arrangement. Alternatively, the magnetic member may be formed by magnetized regions of a magnetic strip or a magnetic foil or by any other magnetic means for producing a magnetic member having at least two magnet poles of opposite polarity.

Advantageously, the magnetic member produces a magnetic field only on one side of the end of the band device it is arranged on. Namely, the magnetic member preferably produces a magnetic field substantially only on the side of the associated first or second end carrying the first or second surface along which the first and second end abut in the closed position of the band device.

This has two major benefits:
First, if a magnetic field is produced only towards one side of each end, it can be made sure that the ends of the band device are attached to each other always in the right position with respect to each other in that the first surface of the first end and the second surface of the second end are approached to abut each other in the closed position. In particular, it can be avoided that the first end with a surface opposite the first surface abuts the second end on a surface opposite the second surface.
Second, if a magnetic field is produced only towards the side on which the engagement of the two ends is achieved, but substantially not towards the other side facing a user's limb (if the band device is placed around a user's limb), it can be made sure that no (large) magnetic fields reach into the human tissue which may be beneficial for the user's comfort.

To produce a magnetic field only on one side of the associated end carrying the magnetic member, different approaches can be taken. First, a magnetic strip or magnetic foil of an (isotropic) magnetizable material can be magnetized only on one side forming magnet poles side by side on one side of a planar foil or strip. Alternatively, in particular, when forming the magnetic member of discrete magnet elements, a so called Halbach array can be formed producing a magnetic flux towards one side, but substantially not producing any magnetic flux to the other side. To form such a Halbach array segments of permanent magnets are arranged by tilting the magnetization direction of adjacent elements by 90°. In this way, the magnetic flux is emphasized towards one side of the arrangement and is almost cancelled at the other side.

In one embodiment, the at least one engagement opening extends longitudinally along the extension direction and has an opening width along the extension direction larger than the width of the at least one engagement element such that the at least one engagement element is displaceable in the at least one engagement opening along the extension direction.

In particular, in a closed position of the band device in which the band device for example is placed around a user's limb, the engagement element is placed in the associated engagement opening in such a way that the ends of the band are held on each other in a positive locking manner in a direction towards widening the aperture formed by the closed band device. The ends of the band device hence are mechanically fastened on each other by means of the engagement element engaging the engagement opening. In an opposite direction, towards reducing the aperture enclosed by the closed band device, the engagement element however can be displaced in the longitudinally extending engagement opening such that the ends of the band device can be moved with respect to each other in such opening direction.

Such relative movement in the opening direction allows for moving the magnet poles of the magnetic members of the two ends of the band device with respect to each other such that for opening the band device, poles of equal polarity can be approached to provide for a weakening of the magnetic attraction force or even a magnetic repulsion force between the two ends of the band device for comfortably opening the band device.

The width of the engagement opening along the extension direction may be such that the engagement element can be moved within the engagement opening by at least half the width, preferably by once the width, of one of the at least two magnet poles of the first and/or second magnetic member. By moving the two ends of the band device relative to each other by at least half the width of a magnet pole the magnetic attraction force between the two ends of the band device can at least be decreased. If the ends are displaced with respect to each other by exactly the width of one magnet pole, magnet poles of equal polarity are approached towards each other and come to lie opposite to each other, such that a repulsion force between the ends is produced allowing for an easy, comfortable opening of the band device.

In one embodiment, a multiplicity of engagement elements are arranged equally spaced along the extension direction on the first end and/or a multiplicity of engagement openings are arranged equally spaced along the extension direction on the second end. Such multiplicity of engagement elements and/or engagement openings allow for a closing of the band device in different, discrete closing positions, wherein in each discrete closing position at least one engagement element engages into at least one engagement opening.

It also is possible that a combination of engagement elements and engagement openings is arranged both on the first end and on the second end.

Preferably, the spacing between two adjacent engagement elements and/or between two adjacent engagement openings along the extension direction equals the periodic width of the magnetic pattern formed by the at least two magnet poles, or that periodic width multiplied by a whole number. If the spacing between the engagement elements and/or engagement openings equals the periodic width of the magnetic pattern formed by the magnet poles on the first end and the second end, the two ends are attracted to each other similarly in the different, discrete positions in which they can be fastened to each other. The different closed positions defined by the engagement elements and the engagement openings hence are magnetically and functionally similar such that the band device can be comfortably closed in the different discrete closed positions.

Whereas for closing the band device a magnetic attraction force between the magnetic members of the ends is produced, thus pulling the ends together into a position in which at least one engagement element is in engagement with an associated engagement opening, for opening the band device the ends of the band device can be moved with respect to each other along the longitudinal extension direction of the band device such that the magnetic members of the two ends are moved with respect to each other, hence weakening the magnetic attraction force or possibly even reversing it into a magnetic repulsion force, thus allowing for an easy, comfortable opening of the band device.

The at least one engagement element may have a pin shape or any other sheer-force resistant shape protruding from the first end. In another embodiment, however, the at least one engagement element may comprise a hook section forming an undercut in which the second end engages in the closed position of the closure device. Such hook section preferably is formed such that it can reach through an associated engagement opening of the second end of the band device, wherein the second end can be brought into engagement with the hook section in an engagement direction opposite the opening direction. By means of the hook section the two ends of the band device hence in the closed position of the closure device are securely held on each other, thus ensuring that the engagement element of the first end cannot without further ado, in particular without intentionally opening the band device, be brought out of engagement with the engagement opening of the second end. In particular, if a hook section is provided on the engagement element, the second end must be pulled in the opening direction with respect to the first end before the ends can be separated from one another.

The object is also achieved by a band device, in particular a wristband, which extends longitudinally along an extension direction and at least in sections is formed flexible for placing it around a user's limb, comprising:
- a first end,
- a second end, and
- a closure device for connecting the first end and the second end to each other such that the first end and the second end are held on each other in a closed position of the closure device, Herein, the closure device comprises
- a first closure member connected to the first end and having a rigid first locking protrusion and
- a second closure member connected to the second end and being attachable to the first closure member such that in the closed position the second closure member is held on the first closure member, the second closure member having a rigid second locking protrusion, wherein the second locking protrusion is engageable with the first locking protrusion in an engagement direction and in the closed position engages the first locking protrusion in a positive locking manner, wherein the first closure member comprises a first magnetic member and the second closure member comprises a second magnetic member, the first magnetic member and the second magnetic member being constituted to magnetically attract each other when the second closure member is attached to the first closure member for closing the closure device.

Preferably, the closure device comprises a force application element pivotably attached to the second closure member at a force application location in the vicinity of the second locking protrusion, the force application element being constituted to introduce a force into the second closure member.

Accordingly, the second closure member is pivotably connected to the force application element which serves to introduce a force into the second closure member when the closure device is subjected to forces in its closed position. Because the force application element acts onto the second closure member at a force application location in the vicinity of the second locking protrusion and hence at that location at which the second closure member engages the first closure member in a positive locking manner, large loads can be taken up by the closure device in a fairly large range of pivoting positions of the force application element relative to the second closure member, such that the risk for an unintentional opening of the closure device under load is reduced.

The force application element may for example be a bracket pivotable about a pivot axis on the second closure member. The pivot axis herein constitutes the force application location and hence assumes the shape of a line.

Just as well, the force application element may be a rope, a chain or a cable pivotable about a pivot point on the second closure member. In this case the pivot point constitutes the force application location, which hence assumes the shape of a single point. The rope, chain or cable may be rigid or flexible.

The force application element may also be constituted by the band device itself. Hence, the band device with its (second) end may directly be connected to the second closure member. In this regard, by stating that the force application element is connected to the second end it shall be meant that the force application element may also be formed in one piece with the second end and hence is constituted by the second end itself.

If a bracket is used as force application element, it may form a pivoting joint with the second closure element, wherein the joint may be formed on two sides or on a single side or on a central point of the second closure member. The same applies if the force application element is a rope, chain or cable which also may pivotably be attached to two sides, a single side or a central point of the second closure member.

The pivoting joint, in particular if a bracket is used as force application element being pivotable about a pivot axis, may be opened in a direction perpendicular to the pivot axis such that the bracket may be clipped into an opening forming the joint in order to attach the bracket to the second closure member. Just as well, an opening forming the joint may circumferentially be closed in all directions perpendicular to the pivot axis, such that the bracket may only be attached to the joint by inserting it into a respective opening along the pivot axis.

In particular if the force application element is shaped as a chain, rope or cable, it may be adjustably attached to the second closure member such that it can be adjusted in its length. For this, for example a ring may slidably be arranged on the chain, rope or cable such that by varying the position of the ring on the chain, rope or cable the length of the chain, rope or cable can be adjusted.

In one embodiment, the first closure member comprises a base and a locking element rigidly attached to the base and carrying the first locking protrusion. The second closure member, in turn, comprises a locking part carrying the second locking protrusion and having a front face which in the closed position faces the locking member of the first closure member. The locking element with the first locking protrusion arranged thereon and the base herein beneficially form a U-shaped recess in which the locking part of the second closure member with its second locking protrusion engages in the closed position such that the second closure member with its second locking protrusion is held in a positive locking manner in the U-shaped recess formed by the first locking protrusion, the locking element and the base of the first closure member.

The force application location, i.e. the location at which the force application element engages, herein in one embodiment may be located, in the closed position of the closure device, between the front face of the second closure element and a center of the first magnetic member of the first closure member. The center of the first magnetic member may be determined by a geometric center or a center of mass of a magnet or magnetic armature constituting the first magnetic member. Because the force application location lies in between the front face of the second closure element and the center of the first magnetic member of the first closure member, it is ensured that a beneficial leverage for holding the second closure member in engagement with the first closure member by means of the magnetic attraction force between the magnetic members of the first closure member and the second closure member exists. Because the force application location lies in between the front face and the center of the first magnetic member, a force acting at the force application location will act with a leverage arm which is smaller than the leverage arm of the magnetic attraction force caused by the magnetic members such that a fairly small magnetic attraction force may be sufficient to ensure that the closure members are held in engagement with each other even at fairly large loads acting via the force application element at the force application location on the second closure member.

The first locking protrusion, in a specific embodiment, forms a first leg and the base forms a second leg of the U-shaped recess, the first leg and the second leg extending substantially parallel to each other. The second closure member in this case, in the closed position of the closure device, engages the U-shaped recess with its second locking protrusion, wherein the second locking protrusion in the closed position abuts the first locking protrusion on the inside of the U-shaped recess.

In another embodiment, the first closure member comprises a blocking element which, in the closed position, faces a back face of the second closure member. The back face herein faces in a direction opposite to the engagement direction and lies opposite the front face on the base of the first closure member. The blocking element is constituted to prevent the second locking protrusion from moving out of its engagement with the first locking protrusion in the direction opposite the engagement direction when the closure device is in its closed position. The blocking element hence serves to prevent the second closure member to move out of engagement with the first closure member in a direction opposite the engagement direction such that the second closure member cannot be released without further ado by displacing it against the engagement direction.

The provision of the blocking element may provide for a particularly strong closure device. By means of the blocking element the risk for the closure device to be opened due to large loads acting onto the force application element attached to the second closure member is substantially reduced because a sliding of the second closure member out of engagement with the first closure member against the engagement direction is prevented.

In a further embodiment, the second closure member may comprise a support element attached to the locking part and extending, in the direction opposite to the engagement direction, beyond the locking part. The support element is constituted to prevent an abutment of the back face with the blocking element prior to the second locking protrusion engaging the first locking protrusion when closing the closure device. When the second closure member is approached to the first closure member for closing the closure device, first the support element comes into abutment with the base of the first closure member and guides the movement of the second closure member relative to the first closure member such that the second locking protrusion can slide into engagement with the first locking protrusion without the blocking element hindering such movement.

The blocking element may be rigidly arranged on the base and may be shaped as a protrusion protruding from the base.

In another embodiment the blocking element however can also be elastically arranged on the base of the first closure member such that it can be deflected when the second closure member is attached to the first closure member for closing the closure device. Upon closing the closure device, the second closure member hence comes into abutment with the blocking element of the first closure member and deflects the blocking element such that the second closure member with its second locking protrusion can slide into engagement with the first locking protrusion of the first closure member. Once the second locking protrusion has reached its engagement position (in which it is in engagement with the first locking protrusion) the elastic blocking element snaps back into its original position in which it then blocks the second closure member from being slid out of its engagement with the first closure member in a direction opposite to the engagement direction.

In another embodiment the first locking protrusion, on a side which in the closed position faces away from the second locking protrusion, may comprise a slanted face. In addition or alternatively, also the second locking protrusion, on a side which in the closed position faces away from the first locking protrusion, may comprise a slanted face. In this way, it may be achieved that the second locking protrusion, when attaching the second closure member to the first closure member in a closing direction perpendicular to the engagement direction and perpendicular to a plane along which the base of the first closure member substantially extends, is guided past the first locking protrusion when closing the closure device in that the slanted faces of the locking protrusions come into contact with each other and the second locking protrusion may slide along the first locking protrusion until it can be moved into engagement with the first locking protrusion.

Herein, due to the second locking protrusion sliding on a slanted face when closing the closure device the second closure element is displaced by a certain distance against the engagement direction in order to be able to move the second locking protrusion past the first locking protrusion until the second locking protrusion can be moved into positive locking engagement with the first locking protrusion.

The closure device may be opened from its closed position in different ways.

First, the second closure member, for opening the closure device, may be pivotable with its second locking protrusion about the first locking protrusion in order to disengage the second locking protrusion from its positive locking engagement with the first locking protrusion.

Second, the second closure member may be displaceable in a direction perpendicular to the engagement direction and parallel to a plane in which the base of the first closure member substantially extends such that, by the displacement movement, the second locking protrusion slides along the first locking protrusion and hence is moved out of engagement with the first locking protrusion.

If the second closure member can be disengaged from the first closure member by pivoting it with respect to the first closure member, in addition it also is conceivable that the closure device may also be opened by displacing the closure members with respect to each other, such that in principle two opening movements are possible. For pivoting the second closure member relative to the first closure member a handle may be provided on the second closure member, which allows actuating the second closure member for pivoting it with its second locking protrusion about the first locking protrusion.

If the closure device shall be opened by means of pivoting the second closure member relative to the first closure member, it also is conceivable that the opening by displacing the second closure member with regard to the first closure member is blocked by means of a force application element in the shape of a bracket acting together with for example a locking element of the first closure member or by means of additional side elements preventing a displacement movement of the second closure member relative to the first closure member in a direction perpendicular to the engagement direction and parallel to the plane of extension of the base of the first closure member.

If the closure device shall be opened by displacing the second closure member by sliding the second locking protrusion along the first locking protrusion, it is conceivable to provide no handle on the second closure member allowing for a pivoting of the second closure member. In this regard it is also conceivable that the displacement movement is only possible after for example the force application element is moved into a position in which it does not block the displacement movement. Also, an additional interlocking element may be provided which must be released prior to displacing the second closure member relative to the first closure member. Or it is conceivable to allow a displacement only in one direction by for example attaching the force application element to the second closure member in a way that an opening displacement movement is possible only in one direction.

The force application element may for example constitute a fastening member for fixing the associated (second) end of the band device to the second closure member. Also, the first closure member may carry a fastening member for fixing the associated (first) end of the band device to the first closure member, such that via the closure device the two ends of the band device can be connected to each other.

If the force application element is shaped as a bracket comprising two ends via which the force application element is pivotably attached to at least one opening of the second closure member, it in addition is possible to secure the attachment of the force application element to the second closure member by means of a securing element arranged on the bracket. The securing element holds the bracket together in that its two ends cannot be displaced with respect to each other such that it is prevented that the ends can be detached from the at least one opening of the second closure member. Such bracket together with the securing element may also form a fastening member for attaching the associated end of the band device to the force application element, wherein the securing element serves a first purpose in that it secures the attachment of the bracket to the second closure member and a second purpose in that it holds and secures the end of the band device on the bracket.

The magnetic members may be arranged to generate an attractive force along the engagement direction or in a direction perpendicular to the engagement direction. In the first case the closure members are attracted such that they are pulled towards each other along the engagement direction. In the second case, the magnetic attraction force acts perpendicularly for example to a plane of extension of the base of the first closure member. In the first case magnets of the closure members or a magnet of one of the closure members and a magnetic armature of the other of the closure members face each other along the engagement direction. In the second case magnets of the closure members or a magnet of one of the closure members and a magnetic armature of the other of the closure members face each other in a direction perpendicular to the engagement direction.

On one or on each of the closure members multiple magnets facing the other closure member with opposite poles may be arranged. By such a magnet arrangement it can be ensured that the closure members are attached in the right orientation to each other when closing the closure device in that the magnets interact to move the closure members with respect to each other such that they face each other in a desired manner.

Beyond the embodiments described above the closure device may however have a force application element which can pivotably or rigidly be attached to the second closure member at a force application location. Hence, the closure device may also carry a force application element rigidly attached to the second closure member.

For the closure device it applies that no elastic parts need to be provided for the locking protrusions. This makes it possible to produce the first closure member and the second closure member as metallic parts, for example by means of extrusion profiles. Such extrusion profiles, from metal or plastics, may in an easy and cost efficient manner be fabricated yielding reliable, high-strength parts. Due to the easy structural build of the closure device the closure device in addition is not prone to dirt and hence provides a reliable closure for closing the band device.

In all of the above embodiments, a magnetic field sensor may be provided on the band device, for example on one of the ends of the band device, for sensing, in the closed position, a magnetic field produced by the magnetic members. Herein, the magnetic field sensor may detect the strength of the magnetic fields produced by the magnetic members. Or the magnetic field sensor may detect the position of one or both magnetic members. By means of the magnetic field sensor a signal may be produced which indicates to a user if the closed position has been reached and whether it has been established in a correct manner such that a user receives a feedback about the closing of the band device.

In one embodiment, the band device at least in sections is formed elastic. In particular, the band device may be constituted to in the closed position provide a pretensioning force in a direction towards removing the first end and the second end from each other. In particular, the band device may be pretensioned in its closed position in a direction opposite the opening direction. By means of such a pretensioning of the elastic band device it can be ensured that in the closed position of the band device the engagement element of the first end and the engagement opening of the second end securely can be held in engagement with each other to provide a positive locking connection between the first and the second end.

Alternatively, a pretensioning force can act against removing the ends from each other, for example if an opening of the band device can be achieved by moving the ends perpendicularly to the longitudinal extension direction of the band device.

Preferably, the band device comprises a watch, a mobile computing device, a mobile telephone or another electronic device. Herein, for example a watch may be integrated into the band device itself, or a suitable holding device for (releasably) attaching a watch to the band device may be integrated into the band device. Likewise, a mobile computing device, a mobile telephone or another electronic device may be integrated into the band device or a suitable holding device may be provided on the band device.

In another embodiment, a length adjustment device may be provided on a band section of the band device. Such length adjustment device serves to adjust the length of the band device along the extension direction such that the band device can be adapted to the preferences of different users.

In another embodiment, the band device, at at least one of the first end and the second end, comprises at least one electrical contact for establishing an electrical connection between the first end and the second end or with an external electrical device.

If an electrical contact is each provided on the first end and the second end, such electrical contacts can be brought in contact when closing the band device and hence may serve to provide an (electrical) signal for indicating whether the band device has correctly been closed. Via such electrical contacts the band device may also be connected to an external electrical device, for example, a charging device, such that via the electrical contacts an electric device arranged on or integrated in the band device may electrically be provided with energy.

The external electrical device herein may also be an external device with which an electronic device of the band device may communicate. In that case the electrical contact may provide for a data transfer between an electronic device arranged on the band device and the external electrical device.

It also is conceivable in this regard to provide two electrical contacts on one end of the band device, such that via the one end an electrical connection with an external device can be established for charging an electronic device of the band device or for establishing a data communication link between an external device and the electronic device of the band device.

The object is also achieved by means of an arrangement of an external electric device and a band device, in particular a wristband, with an electronic device arranged thereon, wherein the band device extends longitudinally along an extension direction, at least in sections is formed flexible for placing it around a user's limb and comprises at least one magnetic member and at least one electrical contact, and the external electric device comprises at least one magnetic member and at least one electrical contact, wherein in a connected state in which the band device is connected to the external electrical device the at least one electrical contact of the band device and the at least one electrical contact of the external electric device are electrically contacted for establishing an electrical connection between the band device and the external electric device, and wherein the at least one magnetic member of the band device and the at least one magnetic member of the external electric device are constituted to interact for guiding the at least one electrical contact of the band device into contact with the at least one electrical contact of the external electrical device when connecting the band device to the external electrical device.

The band device in this regard may be constituted according to the type described previously.

In particular, at least one magnetic member of the band device may be placed on an end of the band device. In this regard, it is also conceivable that both ends of the band device each comprise a magnetic member and carry an electrical contact such that the band device via its two ends can be connected to the external electric device.

In another embodiment, one of the band device and the external electric device comprises an engagement element and the other of the band device and the external electric device comprises an engagement opening, wherein in the connected state the engagement element is in engagement with the engagement opening. Hence, in the connected state, the band device is mechanically held on the external electric device such that a safe connection between the band device and the external electric device is established.

In a particular embodiment the band device may comprise a first end, a second end and a closure device for connecting the first end and the second end of the band to each other such that the first end and the second end are held on each other in a closed position of the closure device. Herein, the closure device may comprise at least one engagement element arranged on the first end and at least one engagement opening arranged on the second end, wherein in the closed position of the closure device the at least one engagement element engages the at least one engagement opening.

Preferably, the closure device further comprises a first magnetic member arranged on the first end and a second magnetic member arranged on the second end, wherein the first magnetic member and the second magnetic member each comprise at least two magnet poles of opposite polarity, the at least two magnet poles being displaced with respect to each other along surfaces of the first end and the second end along which the first end and the second end abut in a closed position of the closure device.

BRIEF DESCRIPTION OF THE DRAWINGS

The idea underlying the invention shall subsequently be described in more detail with regard to the embodiments shown in the figures. Herein:

FIG. 1 shows a schematic view of a band device having two ends, a first end having an engagement element and a second end having an engagement opening, the engagement element engaging the engagement opening in a closed position of the band device;

FIG. 3A shows a schematic sectional view along the extension direction of the band device when closing the band device;

FIG. 3B shows another schematic sectional view along the extension direction of the band device while closing the band device;

FIG. 4A shows a schematic perspective view of a band device;

FIG. 4B shows a side view of the band device;

FIG. 5A shows a schematic perspective view of another embodiment of the band device;

FIG. 5B shows a schematic side view of the band device;

FIG. 8B shows the band device of FIG. 8A in a closed position;

FIG. 9A, 9B show perspective explosive views of a first embodiment of a closure device;

FIG. 10A-15A show perspective views of the closure device in different positions;

FIG. 10B-15B show a top view of the closure device in the states according to FIG. 10A to 15A;

FIG. 10C-15C show sectional views along lines A-A to F-F according to FIG. 10B to 15B;

FIG. 17 shows a schematic side view of a band device having electrical contacts at its ends;

FIG. 18 shows a schematic view of a band device attached to an external electric device.

DETAILED DESCRIPTION OF THE INVENTION

FIG. 1 to 4A, 4B show an embodiment of a band device 5 extending longitudinally along an extension direction L, as indicated for example in FIGS. 1 and 4B. The extension direction L herein may be bent according to the shape of the band, as visible from FIG. 4B. The band device 5 may for example carry a watch, an electronic computing device, a mobile phone or another electronic device. Via the band device 5 a watch or the like may be fastened on a user's limb by closing the band device 5 around the user's limb.

Figure 2A:
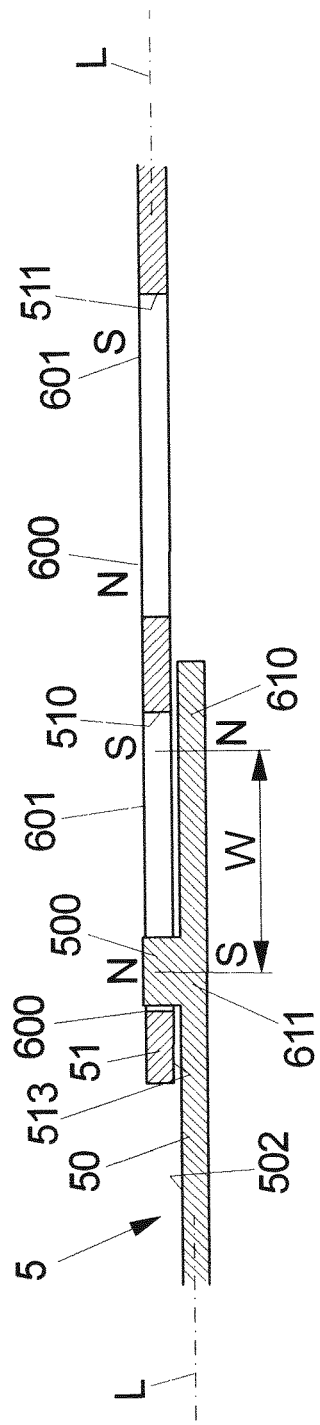
FIG. 2A shows a schematic sectional view along an extension direction of the band device in a closed position of the band device.

The band device 5 comprises a first end 50 and a second end 51. For closing the band device 5 for placing it around a user's limb the ends 50, 51 of the band device 5 may be connected to each other such that in a closed state, as shown in FIG. 2A the ends 50, 51 are fixed to each other.

In this regard it is to be noted that the term "end" in the meaning of this text shall indicate an end section of a band device.

On the first end 50 an engagement element 500 in the shape of a protruding pin is arranged. The pin is placed on a surface 502 of the first end 50 and protrudes vertically from that surface. The second end 51 in turn comprises multiple engagement openings 510, 511 into which the engagement element 500 can be inserted such that in the closed state of the band device 5 it is in engagement with an engagement opening 510, as shown in FIG. 2A.

In the closed state of the band device 5 the two ends 50, 51 abut each other. Herein, the surface 502 of the first end 50 on which the engagement element 500 is arranged abuts a surface 513 of the second end 51 such that in the closed state the ends 50, 51 are placed on each other in a planar fashion.

Each end 50, 51 carries a magnetic member 60, 61 forming multiple magnet poles 600, 601, 610, 611 which are displaced with respect to each other along the longitudinal extension direction L forming an alternating sequence of magnetic poles 600, 601, 610, 611. Thus, on the first end 500 multiple magnet poles 610, 611 of opposite polarity are arranged in an alternating fashion (see for example FIG. 4A). Likewise, on the second end 50 multiple magnet poles 600, 601 of opposite polarity are arranged in an alternating fashion. Hence, both on the first end 50 and on the second end 51 a north pole (N) is followed by a south pole (S) which again is followed by a north pole (N) and so on.

Although the magnet poles 600, 601 of the second end 51 are shown in FIG. 1 to 4A, 4B on a surface of the end 51 facing away from the first end 50 (mainly to simplify the drawing), it is to be understood that the magnet poles 600, 601 with their indicated polarity face the first end 50 to interact with the magnet poles 610, 611 on that first end 50.

The magnetic members 60, 61 together with the engagement element 500 and the engagement openings 510-512 form a closure device 6 for connecting the ends 50, 51 to each other.

For closing the band device 5, as shown in FIG. 3A and 3B, the ends 50, 51 are approached to each other, wherein due to the magnetic members 60, 61 arranged on the two ends 50, 51 a magnetic attraction force between the two ends 50, 51 is provided pulling the ends 50, 51 towards each other into a position, in which the engagement element 500 of the first end 50 engages the engagement opening 510 of second end 51.

In the closed state, hence, as shown in FIG. 2A, the engagement element 500 reaches into the engagement opening 510, wherein the engagement element 500 lies in the engagement opening 510 in a position in which it abuts an edge of the engagement opening 510 in a direction towards widening the aperture enclosed by the band device 5 in the closed position. The engagement of the engagement element 500 into the engagement opening 510 hence provides a positive locking in a direction opposite an opening direction O (see FIG. 2B). Thus, if a force acts between the ends 50, 51 against the opening direction O, such force due to the mechanic engagement of the engagement element 500 and the engagement opening 510 does not lead to an opening of the band device 5.

Figure 2B:
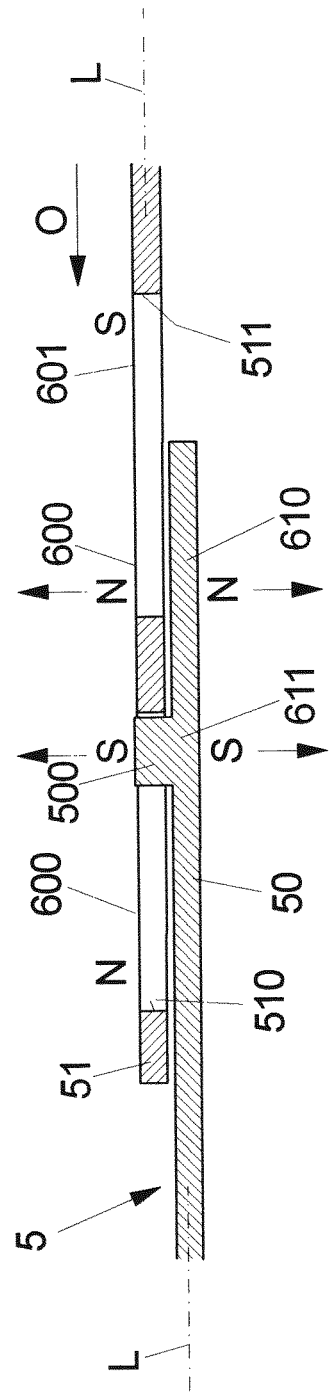
FIG. 2B shows a schematic sectional view along the extension direction of the band device in opened position of the band device.

For opening the band device 5, the engagement element 500 can be displaced within the engagement opening 510 in the opening direction O pointing along the longitudinal extension direction L of the band device 5, as shown in FIG. 2B. For this, the engagement opening 510 is formed as a longitudinal hole extending along the extension direction L, allowing for pulling the second end 51 with respect to the first end 50 in the opening direction O. By such movement, the magnet poles 600, 601, 610, 611 of the ends 50, 51 are moved with respect to each other, wherein in the depicted embodiment poles of equal polarity are approached to each other in the opened state as visible in FIG. 2B, such that a magnetic repulsion force between the two ends 50, 51 results. In such opened state the ends 50, 51 hence in an easy and comfortable manner may be separated from each other for opening the band device 5.

In the example of FIGS. 1 to 4A, 4B, magnet poles 600, 601, 610, 611 are displaced with respect to each other along the longitudinal extension direction L. It has to be understood that this is a matter of example. Likewise, magnet poles 600, 601, 610, 611 possibly can also be displaced with respect to each other in another direction along the surface 502, 513 of the associated end 50, 51, for example in a direction perpendicular to the extension direction L.

Furthermore, the magnet poles 600, 601, 610, 611 do not necessarily form a periodic sequence of alternating polarity. It also is possible to form a periodic sequence of an arbitrary magnetic pattern, in which for example two north poles are followed by a south pole forming a sequence NNSNNSNNS.

In the example of FIGS. 1 to 4A, 4B, the spacing W1 between the engagement openings 510, 511 equals the periodic width W1 of the magnetic member 60 of the second end 51, which is also equal to the periodic width of the magnetic member 61 of the first end 50. By these means the engagement element 500 can be brought into engagement with different engagement openings 510, 511, wherein in each discrete closing position magnetic attraction forces for pulling the engagement element 500 into engagement with the associated engagement opening 510, 511 are provided.

The width W of the magnet poles 600, 601, 610, 611 in the depicted embodiment is equal. This however does not necessarily have to be the case. It also is possible that different magnet poles 600, 601, 610, 611 have a different width W.

In the shown example the engagement element 500 can be displaced in the engagement opening 510 by exactly the width W of the magnet poles 600, 601, 610, 611. This allows for a reversal of the magnetic force from a magnetic attraction force in the closed state (FIG. 2A) into a magnetic repulsion force in the opened state (FIG. 2B).

It however is also possible that the engagement opening 510, 511 is formed to allow for a smaller or larger displacement, for example by only half the width W of the magnet poles 600, 601, 610, 611. This at least allows for a reduction of the magnetic attraction force for opening the band device 5.

In the shown example the band device 5 is made of an elastic material, for example from plastics or from another elastic material. In a neutral state, as shown in FIG. 4A and 4B, herein the ends 50, 51 are approached to each other, wherein for closing the band device 5 after placing it for example around a user's limb the ends 50, 51 can be attached to each other and are held in the closed position by means of the magnetic attraction forces of the magnetic members 60, 61 and by means of the mechanic connection due to the engagement element 500 engaging into an engagement opening 510, 511.

As visible from FIG. 4A, 4B, in the neutral position of the band device 5 the ends 50, 51 lie, when viewed along a circumferential direction around the band device 5, approximately at the same location. Hence, a first engagement position may be provided in which the ends 50, 51 can be attached to each other under substantially no pre-tensioning force acting between the ends 50, 51 due to the elasticity of the band device 5. In further engagement positions corresponding to different aperture openings of the band device 5, however, the band device 5 may be elastically tensioned such that a pretensioning force between the ends 50, 51 acts in such engagements positions in a direction opposite the opening direction O.

In a different example, shown in FIG. 5A and 5B, in the neutral state the ends 50, 51 may however be also be placed apart from one another such that the band device 5 in comparison to the embodiment of FIG. 4A, 4B is farther opened. For closing the band device 5 the ends 50, 51 are approached and attached to each other, wherein in each closed position of the band device 5 due to the elastic pretensioning of the band device 5 an elastic force acts against the opening direction O (in the direction of the arrows shown in FIG. 5B). This pretensioning force may provide for a secure connection of the ends 50, 51 by means of the engagement element 500 on the first end 50 engaging into an engagement opening 510, 511 on the second end 51 under the action of an elastic load.

FIGS. 6 and 7A-7C show another embodiment of a band device 5 which in principle is similar to the embodiments described previously, but instead of an engagement element 500 in the shape of a pin, as it has been used in the embodiments of FIGS. 1 to 5A, 5B, comprises an engagement element 500 having a hook section 501 arranged thereon, thus forming an undercut to be brought into engagement with an engagement opening 510, 511.

Figure 7A:
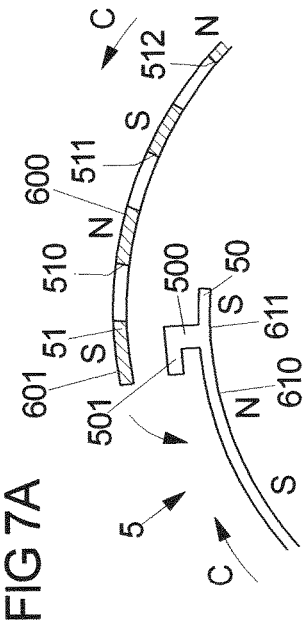
FIG. 7A shows a schematic view during closing the band device.
Figure 7B:
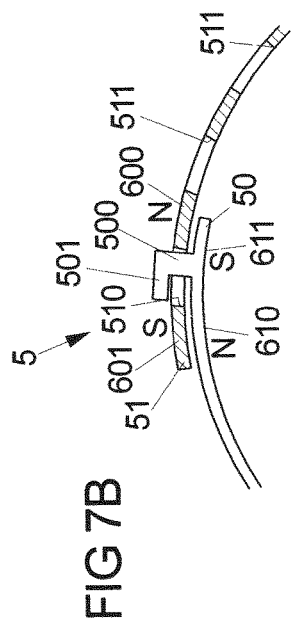
FIG. 7B shows another schematic view during closing the band device.
Figure 7C:
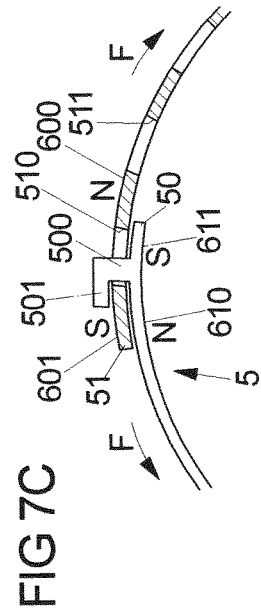
FIG. 7C shows a schematic view of the band device in a closed position.
Figure 6:
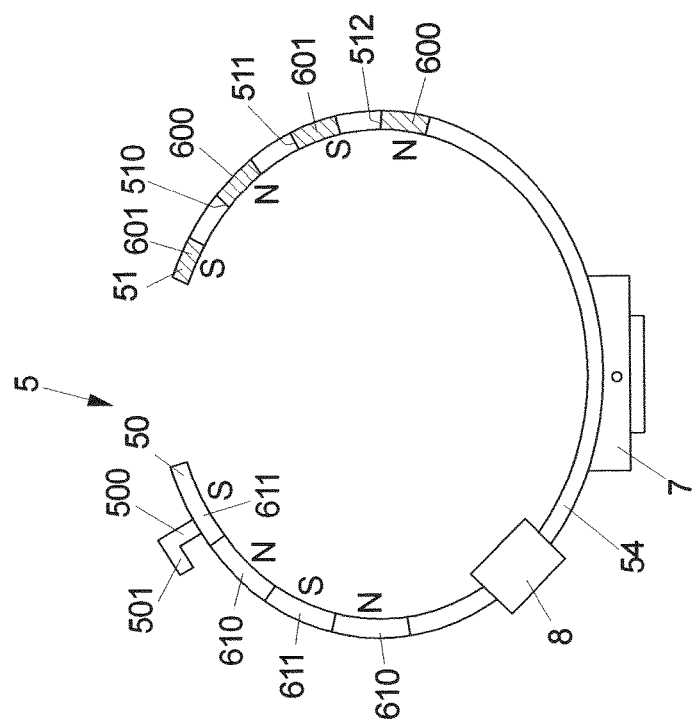
FIG. 6 shows a schematic side view of a band device having an engagement element in the shape of a hook.

The engagement element 500 having the hook section 501 herein is for example beneficial if the band device 5 in its neutral position, shown in FIG. 6, has its ends 50, 51 placed apart from one another and is formed elastic such that in a closed state, shown in FIG. 7C, an elastic pretensioning force F acts between the ends 50, 51, hence pulling an edge section of an engagement opening 510 of the second end 51 into engagement with the undercut formed by the hook section 501 of the engagement element 500 of the first end 50. The undercut herein is opened in the opening direction O such that the pretensioning force F acting onto the second end 51 pulls the associated edge section of the engagement opening 510 into engagement with the undercut against the opening direction O, hence enhancing the engagement of the engagement element 500 with the engagement opening 510.

In the depicted embodiment, for closing the band device 5 the ends 50, 51 are attached to each other (FIG. 7A) under support of the magnetic attraction forces of the magnetic members 60, 61 arranged on the two ends 50, 51. The closing herein may take place such that the ends 50, 51, under the action of the magnetic attraction force between the magnetic members 60, 61, first reach the position of FIG. 7B in which the edge section of the engagement opening 510 not yet is in engagement with the undercut formed by the hook section 501 of the engagement element 500. Due to the elastic pretensioning force F acting between the ends 50, 51 the hook section 501 is then pulled into engagement with the edge section of the engagement opening 510, as shown in FIG. 7C, The magnet poles 600, 601, 610, 611 herein lie, in the closed state of FIG. 7C, in a position with respect to each other in which they (exactly) face each other with opposing polarity such that in the closed state a maximum magnetic attraction force acts between the magnet poles 600, 601, 610, 611. Just as well it however is also possible that the magnet poles 600, 601, 610, 611 lie exactly opposite each other in the position of FIG. 7B, wherein in the closed state according to FIG. 7C magnet poles 600, 601, 610, 611 of opposite polarities of the two ends 50, 51 do not lie exactly opposite to each other, but are displaced with respect to each other by a small margin.

As shown in FIG. 6, a length adjustment device 8 can be attached on a band section 54 of the band device 5 allowing for an adjustment of the length of the band device 5 along the extension direction L. A length adjustment device 8 of this kind may be used in any of the band devices 5 described herein.

As also indicated in FIG. 6, a watch 7 or another electronic device, for example a mobile computing device or a mobile phone, may be attached to or integrated into the band device 5. The band device 5 hence may serve to fasten a watch, a mobile computing device, mobile phone or the like to a user's limb.

Figure 8A:
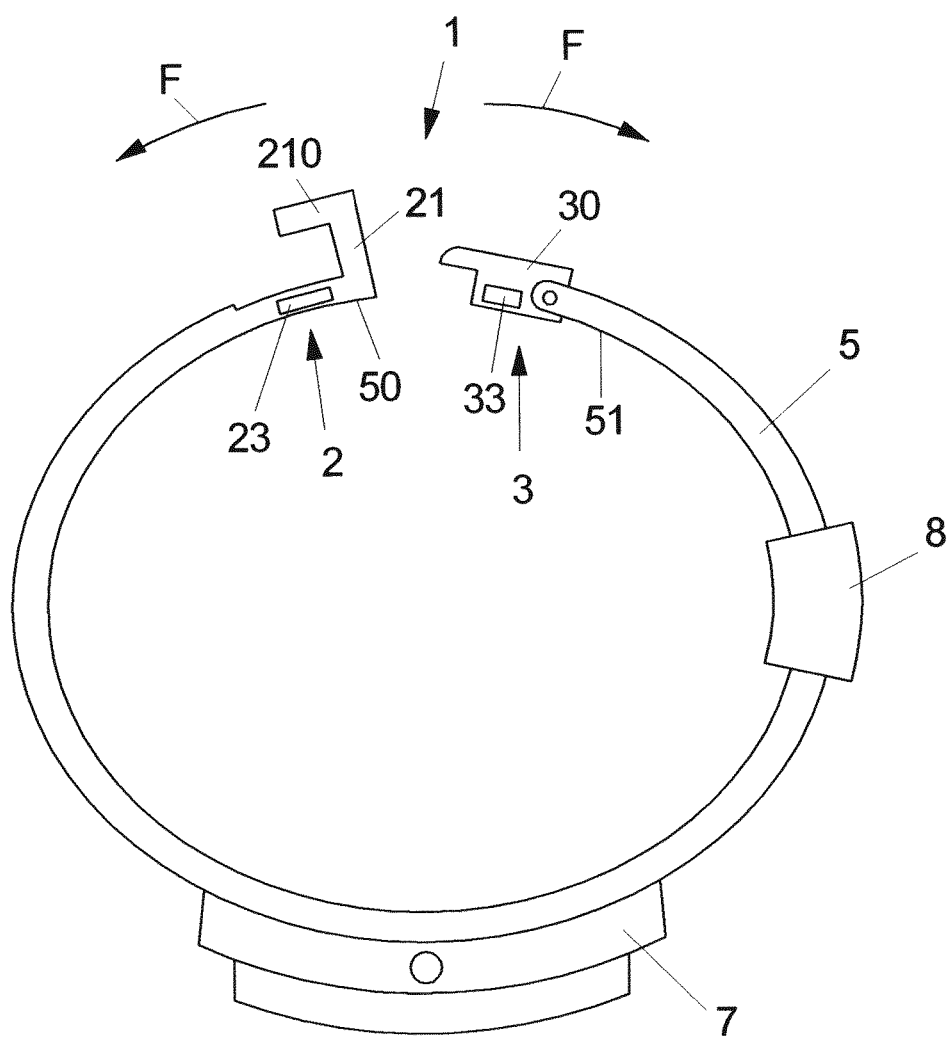
FIG. 8A shows a side view of a band device having a closure device comprising a first closure element and a second closure element.
Figure 8C:
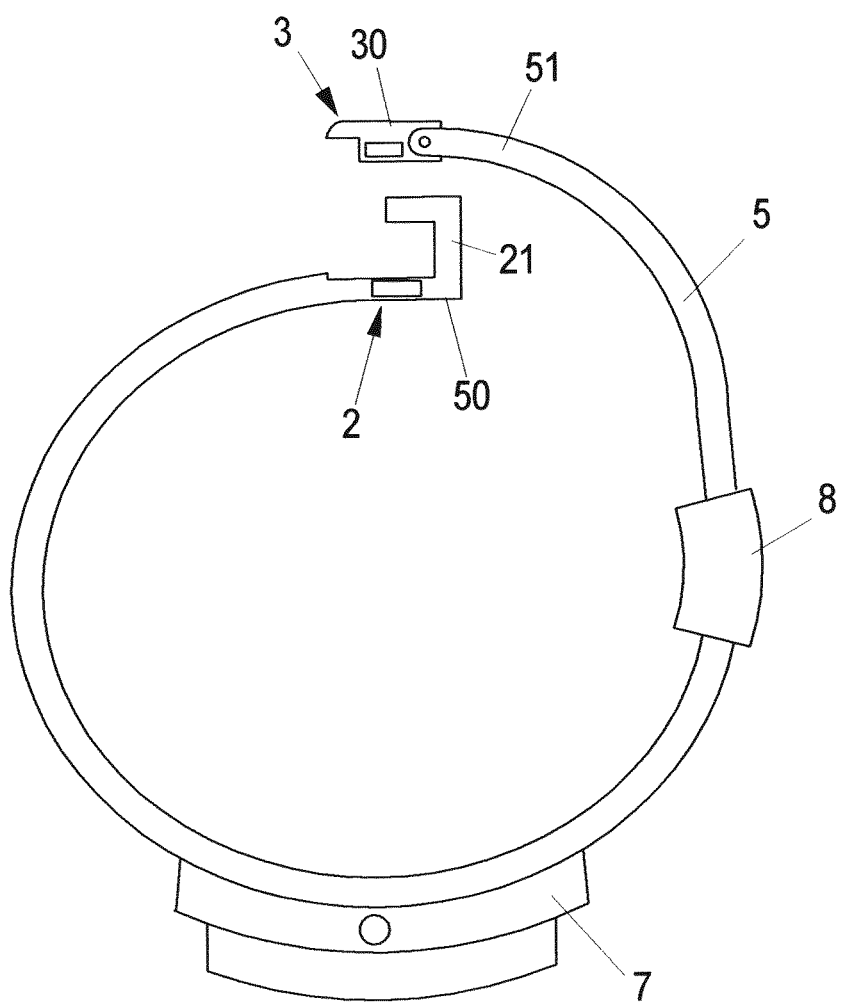
FIG. 8C shows the band device of FIG. 8A in an opened position.
Figure 9A:
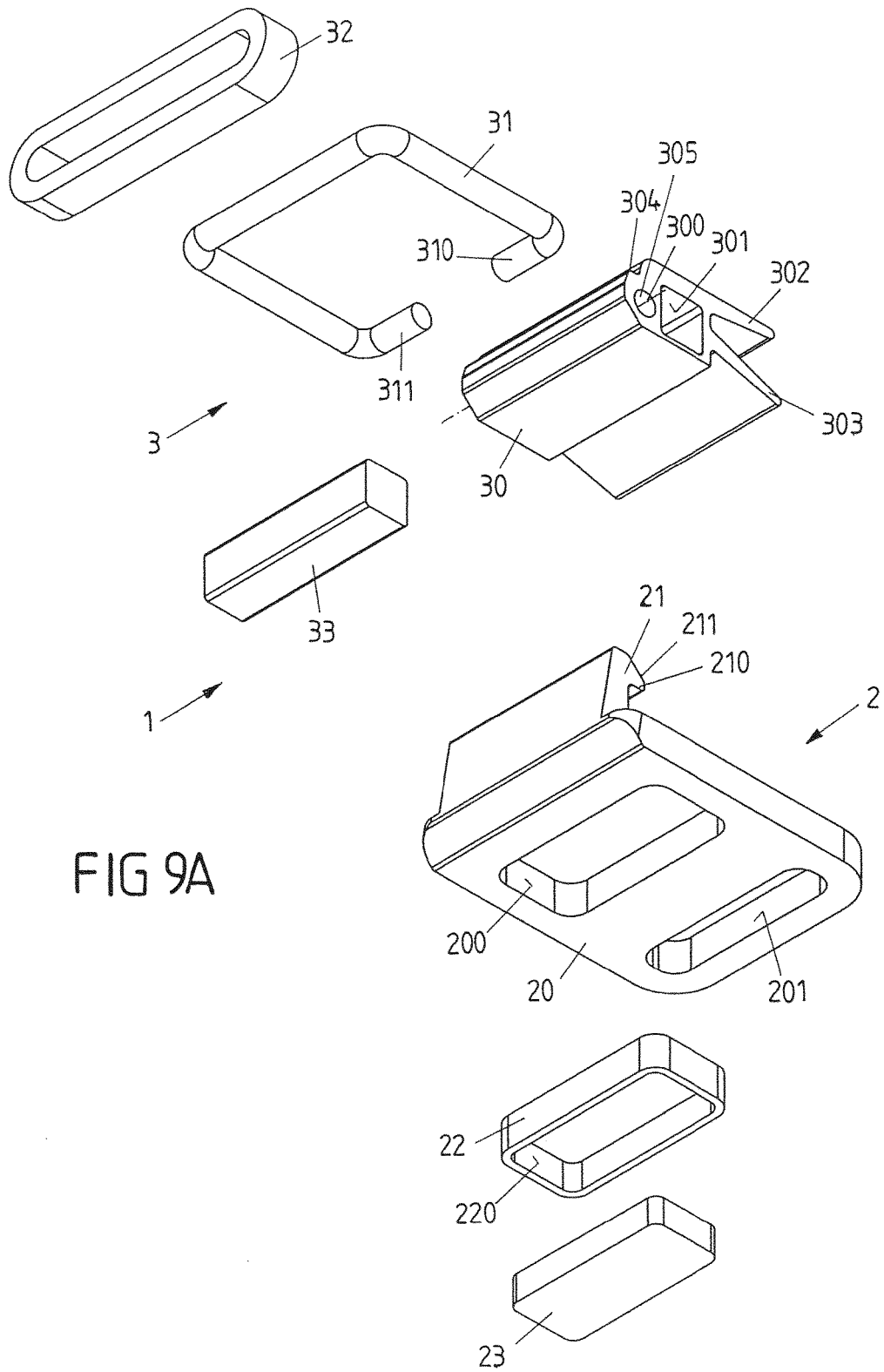

Another embodiment of a band device 5 having two ends 50, 51 is shown in FIG. 8A-8C. The band device 5 comprises a closure device 1 having a first closure member 2 and a second closure member 3. The first closure member 2 comprises a locking element 21 carrying a locking protrusion 210 forming an undercut. The second locking member 3 comprises a locking part 30 which, in a closed position of the closure device 1 as shown in FIG. 8B, engages the undercut formed by the locking element 21 and hence connects the ends 50, 51 of the band device 5 with each other.

Each closure member 2, 3 comprises a magnetic member 23, 33 in the shape of a magnet or a magnetic armature such that the closing of the closure device 1 is supported magnetically by means of the magnetic members 23, 33 attracting each other when closing the closure device 1.

The functional principle of the closure device 1 shall subsequently be described in detail with reference to FIG. 9A, 9B to 16A, 16B.

Herein, the first closure member 2 comprises a base 20 carrying a locking element 21 with a locking protrusion 210. The locking element 21 is rigidly attached to the base 20, extends from the base 20 and carries the rigid locking protrusion 210. The base 20 and the locking element 21 with the locking protrusion 210 may beneficially be formed in one piece from plastics or metal.

The base 20 comprises an opening 200 into which a magnet housing 22 receiving, in a reception opening 220, a magnetic member 23 in the shape of a magnet or a magnetic armature is inserted such that the magnetic member 23 is fixedly held on the base 20.

The base 20 furthermore has a fastening member 201 to which the associated end 50 of the band device 5 can be attached. The base 20 may however also be rigidly fixed to the first end 50 or may be integrated with the first end 50 of the band device 5, as shown in FIG. 8a-8C.

A second closure member 3 comprises a locking part 30 carrying a locking protrusion 304 and having a longitudinally extended opening 300 for attaching a force application element 31 in the shape of a bracket to the locking part 30. The locking part 30 furthermore has a central opening 301 into which a magnetic member 33 in the shape of a magnet or a magnetic armature can be inserted such that the magnetic member 33 is fixedly held on the locking part 30.

From the locking part 30 a handle 302 and a support element 303 extend. The handle 302 serves to actuate the locking part 30 for opening the closure device 1 from a closed position. The support element 303 serves to ensure that the locking part 30 can be attached to the first closure member 2 in an easy, comfortable, reliable way, as shall be explained subsequently in more detail.

Attached to the force application element 31 in the shape of the bracket is a securing element 32 which reaches around the bracket 31 in a state in which it is attached to the bracket 31. The securing element 32 together with the bracket 31 serves as a fastening member for attaching the associated end 51 of the band device 5 to the second closure member 3. Furthermore, the securing element 32 serves to secure the bracket 31 on the locking part 30 after the bracket 31 has been attached to the locking part 30 by inserting its two ends 310, 311 into the longitudinal opening 305 of the locking part 30.

The locking part 30 may however also be directly linked to the second end 51 of the band device in a pivotable fashion, as shown in FIG. 8a-8C. The locking part 30 herein not necessarily is linked to the second end 51 by means of a pivotable joint, but may also be rigidly connected to the second end 51, as long as the second end 51 can be sufficiently bent to allow for an opening movement of the locking part 30 with respect to the base 20, as will be described in detail in the following.

The force application element 31 in the shape of the bracket is, when it is attached to the locking part 30, pivotable relative to the locking part 30 around a longitudinal axis 300. The longitudinal axis 300 in this case forms a force application location in that along this axis 300 forces acting onto the force application element 31 are inserted into the locking part 30.

FIG. 10A to 10C to 15A to 15C show the closure device 1 in different positions. Herein, FIG. 10A to 15A show the closure device 1 in perspective views in an opened state (FIG. 10A), during the closing of the closure device 1 (FIG. 11A to 14A) and in a closed position (FIG. 15A). FIG. 10B to 15B show corresponding top views, and FIGS. 10C to 15C show corresponding sectional views.

Figure 10A:
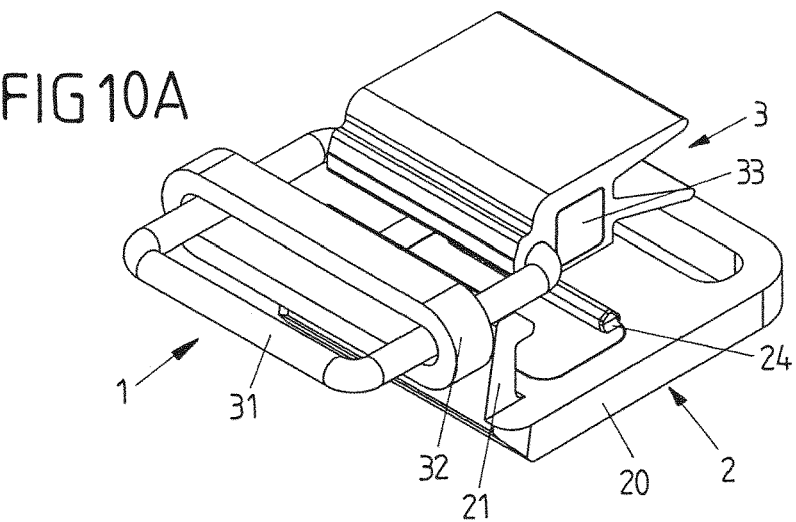
Figure 10B:
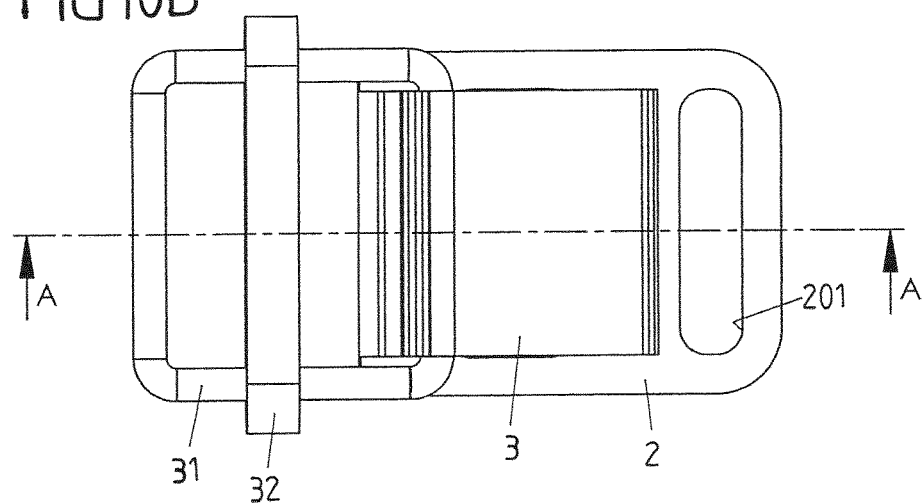
Figure 10C:
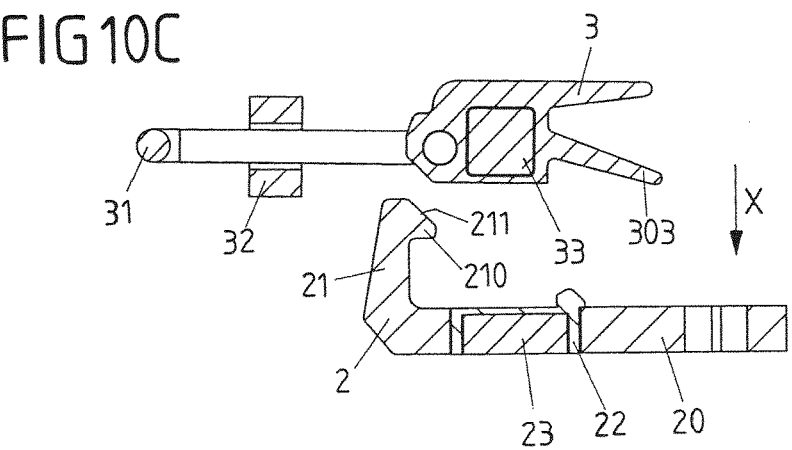

In an opened position, prior to closing, the closure members 2, 3 are separated from each other and may be attached to each other by approaching the second closure member 3 to the first closure member 2 in a closing direction X, which is substantially perpendicular to the base 20 of the first closure member 2 (see FIG. 10C).

When closing the closure device 1, as shown in FIG. 11C, the second closure member 3 approaches the first closure member 2 in the closing direction X, wherein the magnetic members 23, 33 of the closure members 2, 3 generate a magnetic attraction force supporting the approaching movement of the closure members 2, 3 such that the closure members 2, 3 are magnetically pulled together and the closing movement is magnetically supported. When the second closure member 3 approaches the first closure member 2, it comes, via a tilted face 306 on the locking part 30, into contact with a tilted face 211 of the lock protrusion 210 of the first closure member 2. The tilted face 306 is arranged on a front end of the locking part 30 at a position opposite to the locking protrusion 304 of the locking part 30.

Figure 12A:
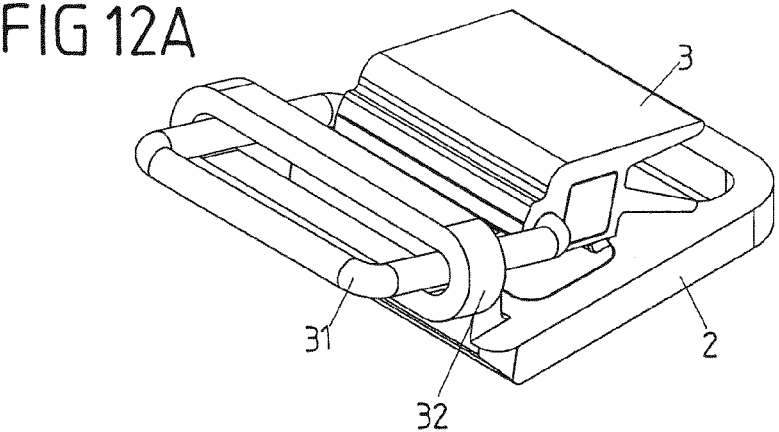
Figure 12B:
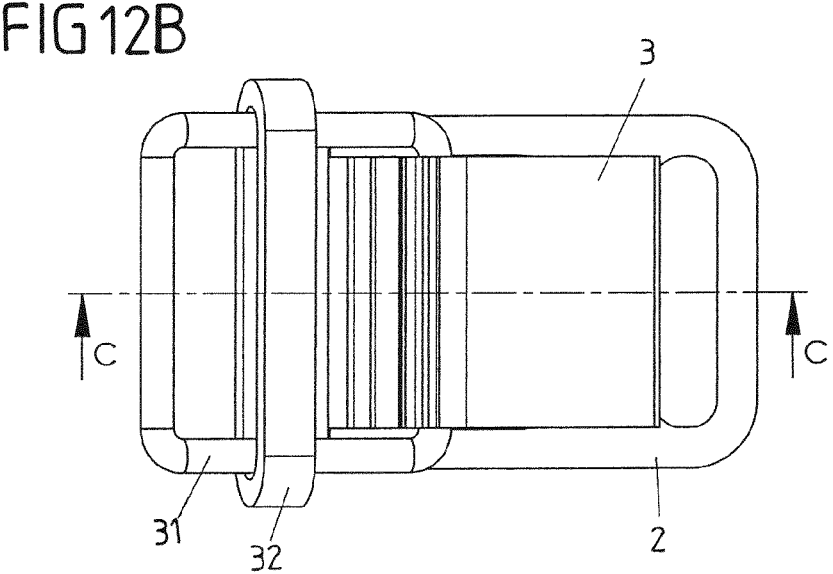
Figure 12C:
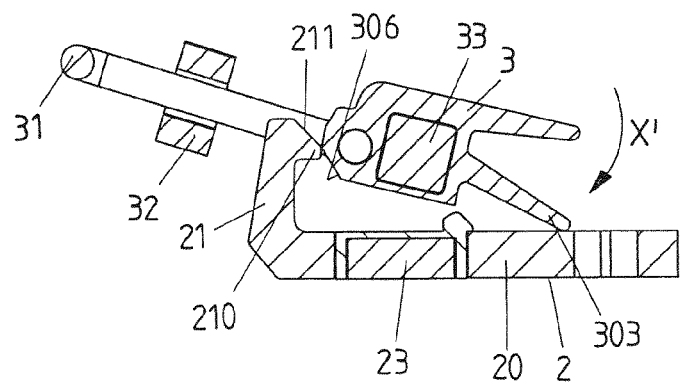

When the second closure member 3 further approaches the first closure member 2, as it is shown in FIG. 12C, the tilted face 306 slides along the tilted face 211 on the locking protrusion 210. The locking part 30 hence is moved past the locking protrusion 210.

Figure 13A:
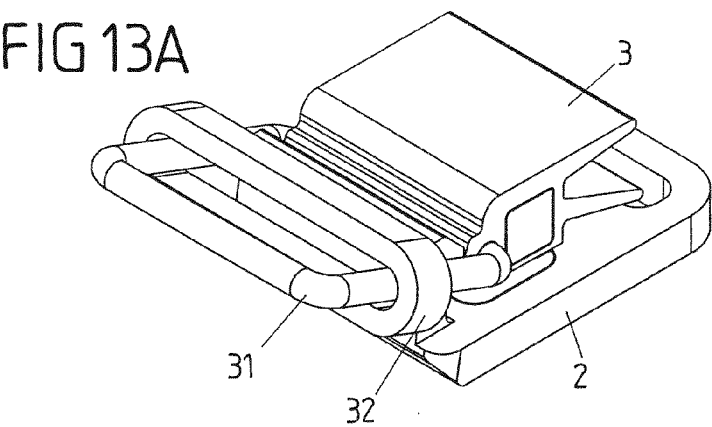
Figure 13B:
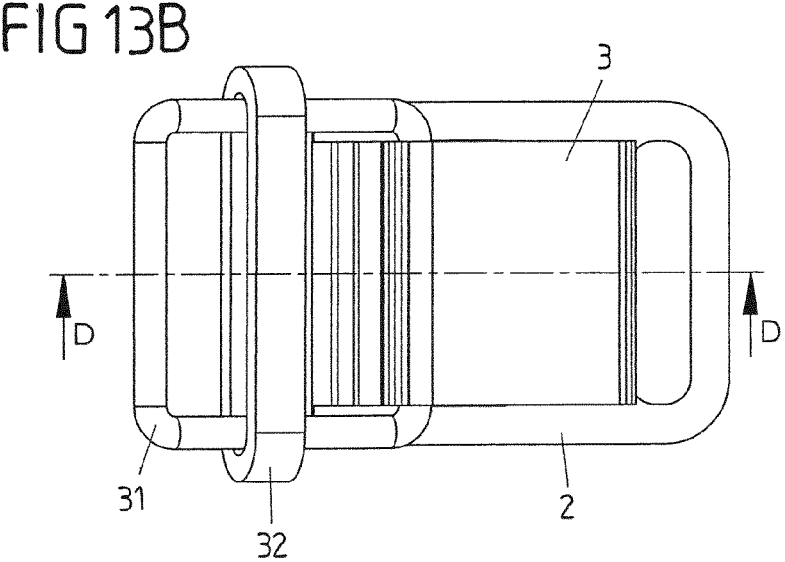
Figure 13C:
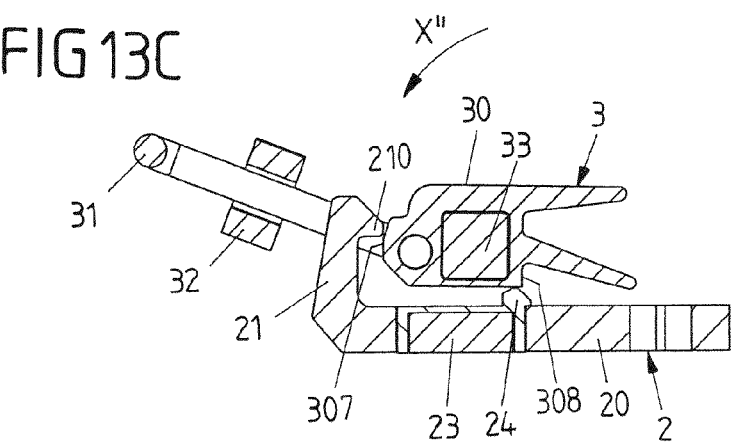

As the magnetic members 23, 33 attract each other at increasing strength the first closure member 3 may pivot such that the support member 303 approaches the base 20 of the first closure member 2 (tilting direction X') and comes into abutment with the base 20. Because the support element 303 comes into abutment with the base 20 and hence supports the locking part 30 on the base 20, the further approaching movement of the first closure member 3 is guided by the support element 303 slidingly moving with its far end along the base 20. This in particular prevents that a back face 308 of the locking part 30 (see FIG. 13C) can come into contact with a blocking element 24 arranged on the base 20 prior to a front face 307 of the locking part having been moved past the locking protrusion 210 of the first closure member, as is shown in FIG. 13C. In this way, it is prevented that the second closure member 3 can be jammed with its locking part 30 in a position which may prohibit the second closure member 3 to reach its closed position. Rather, as shown in FIG. 13C, the locking part 30 with its front face 307 is guided past the locking protrusion 210 of the locking element 21 of the first closure member, such that the second closure member 3 reaches the position shown in FIG. 14C.

In the position of FIG. 14C the locking part 30 with its locking protrusion 304 engages the locking protrusion 210 of the first closure member 2 in that the locking part 30 with its front face 307 has been moved into a U-shaped recess formed by the locking element 21, the locking protrusion 210 and the base 20. The locking part 30 herein has been moved into an engagement direction E into engagement with the U-shaped recess, wherein during the further closing movement and supported by the magnetic attraction between the magnetic members 23, 33 the closure device 1 reaches its closed position shown in FIG. 15C in which the front face 307 faces the locking element 21 and the back face 308 faces the blocking element 24 on the base 20 of the first closure member 2.

Because the locking protrusions 210, 304 are rigidly arranged on the first closure member 2 respectively the second closure member 3, the closing movement is not a simple longitudinal movement, but involves different movements. In particular, the closure members 2, 3 for example in a first phase are approached to each other along a substantially linear closing direction X (see FIG. 10A). The second closure member 3 then however is tilted in a tilting direction X' (see FIG. 12C) in a first tilting orientation and then is tilted back in a tilting direction X" in a second tilting orientation (FIG. 13C) to reach the closed position of FIG. 15C.

In the closed position the second closure member 3 is held on the first closure member 2 in that the locking part 30 of the second closure member 3 is in a positive locking engagement with the locking element 21 carrying the locking protrusion 210 of the first closure member 2. The closure members 2, 3 herein furthermore are held on each other by means of the magnetic members 23, 33 such that an unintentional opening of the closure device 1 is prevented.

Because the force application element 31 in the shape of the bracket is attached to the locking part 30 of the second closure member 3 at the force application location 300 (see FIG. 15C), furthermore a not intended opening due to a large load acting onto the second closure member 3 is effectively prevented. Because the force application location 300 (which corresponds to the pivoting line of the force application element 31 in the shape of the bracket)—viewed along the engagement direction E—lies in between the front face 307 of the locking part 30 and a center 230 of the magnetic member 23 of the first closure member 2, forces introduced into the locking part 30 by means of the force application element 31 will, with a force component acting against the closing direction X, have a small leverage arm compared to the leverage arm of the magnetic attraction forces acting between the magnetic members 23, 33 such that even at large loads an opening of the closure device 1 by means of the loads are prevented.

Furthermore, because a displacement movement of the closure member 3 against the engagement direction E is prevented by means of the blocking element 24 rigidly arranged on the base 20 of the first closure member 2, loads can be introduced in virtually any direction into the second closure member 3 via the force application element 31 without the closure device 1 being opened due to the action of the loads. If loads for example act onto the second closure member 3 substantially in a direction against the engagement direction E, the locking part 30 with its back face 308 will come into abutment with the blocking element 24, such that the locking part 30 cannot be moved out of engagement from the locking element 21.

As a result, a high-strength closure device 1 is provided which in particular is suitable for example as a safety closure being capable of withstanding large loads. Furthermore, due to the simple construction of the closure device 1 the closure device 1 is easy to handle, reliable and not prone to dirt, making the closure device 1 suitable for a large variety of different applications in various environments under various conditions.

As shown in FIG. 15C, a magnetic field sensor 4 may be provided for example on the first closure member 2 (but just as well also on the second closure member 3) in order to obtain a feedback about the closure device 1 having reached its closed position. The magnetic field sensor 4 may for example be capable to sense the magnetic field strength of the magnet arrangement 23, 33 such that from the magnetic fields in the closed position of the closure device 1 it may be derived whether the closure device 1 correctly has reached its closed position or not. This may be indicated to a user for example by means of a light or an acoustic tone or in any other suitable manner.

For opening the closure device 1 a user may act on the handle 302 of the locking part 30 and may pivot the second closure member 3 in an opening direction Y1, as shown in FIG. 15C, in order to tilt the second closure member 3 and to bring it out of its locking relation with the blocking element 24. By tilting the second closure member 3 in that way, the magnetic members 23, 33 are removed from each other and the locking part 30 is tilted out of its engagement with the locking element 21, such that the second closure member 3 can be separated from the first closure member 2.

The handle 302 serves also as lever arm to allow an easy, smooth separation of the magnetic members 23, 33.

For an easy tilting movement the locking part 30 herein is rounded at a front edge facing the outer edge 212 of the locking protrusion 210 such that the locking part 30 with its rounded front edge can be slid past the outer edge 212 of the locking protrusion 210 when tilting the second closure member 3 for opening the closure device 1.

Furthermore, the closure device 1 may be opened by slidingly moving the second closure member 3 in an opening direction Y2, as this is indicated in FIG. 15B. For this, the force application element 31 in the shape of the bracket must be brought into a position in which it does not reach around the locking element 21, such that the second closure member 3 freely can be slid with its locking protrusion 304 along the locking protrusion 210 of the first closure member 2 until the second closure member 3 has come out of its engagement with the first closure member 2.

The locking part 30 of the second closure member 3 and the first closure member 2 may be manufactured from plastic or metal for example by extrusion. Such parts may in an easy manner be produced from extrusion profiles such that the fabrication is easy and cost effective.

In a modification of the previously described embodiment the force application element 31 in the shape of the bracket may also be rigidly attached to the locking part 30.

Figure 16A:
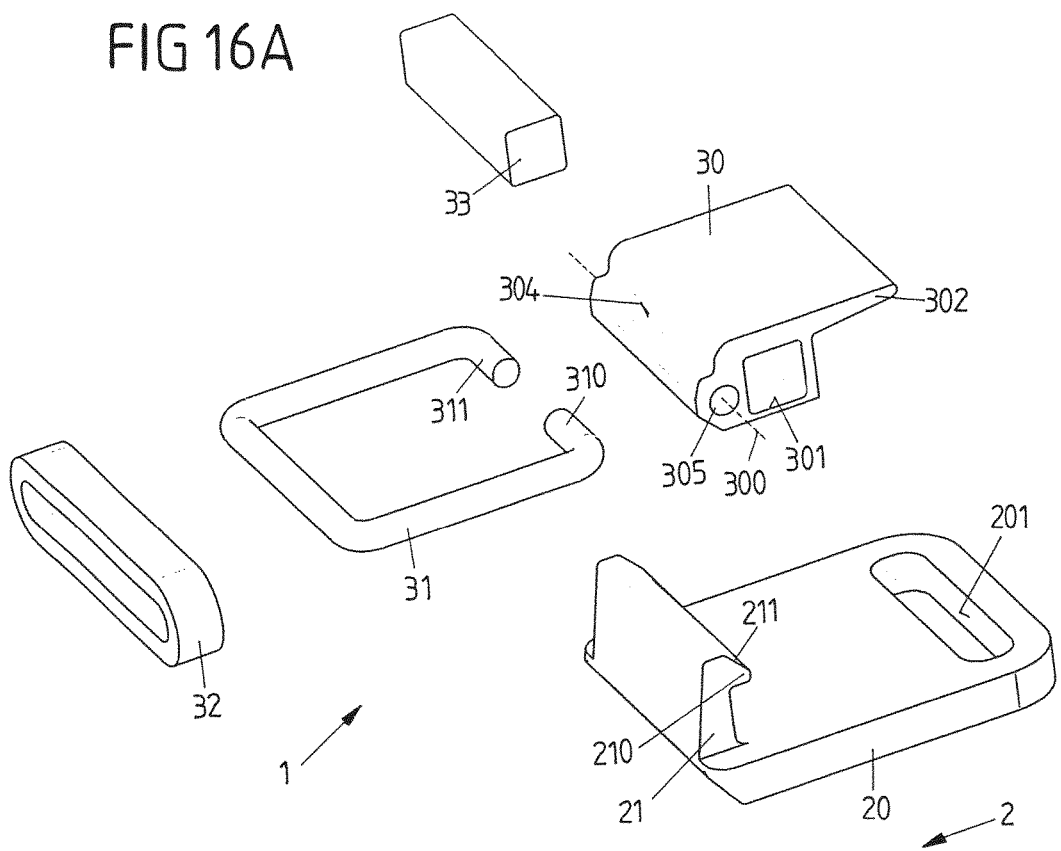
FIG. 16A shows a perspective explosive view of a second embodiment of a closure device.
Figure 16B:
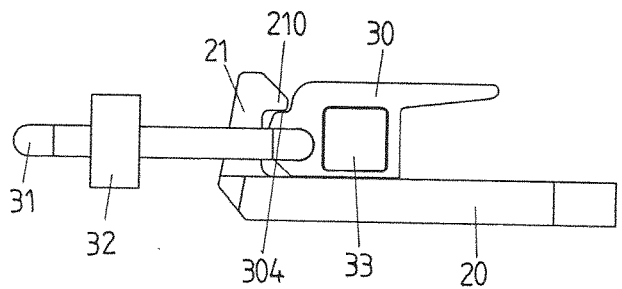
FIG. 16B shows a side view in a closed position of the closure device of FIG. 16A.
Figure 19:
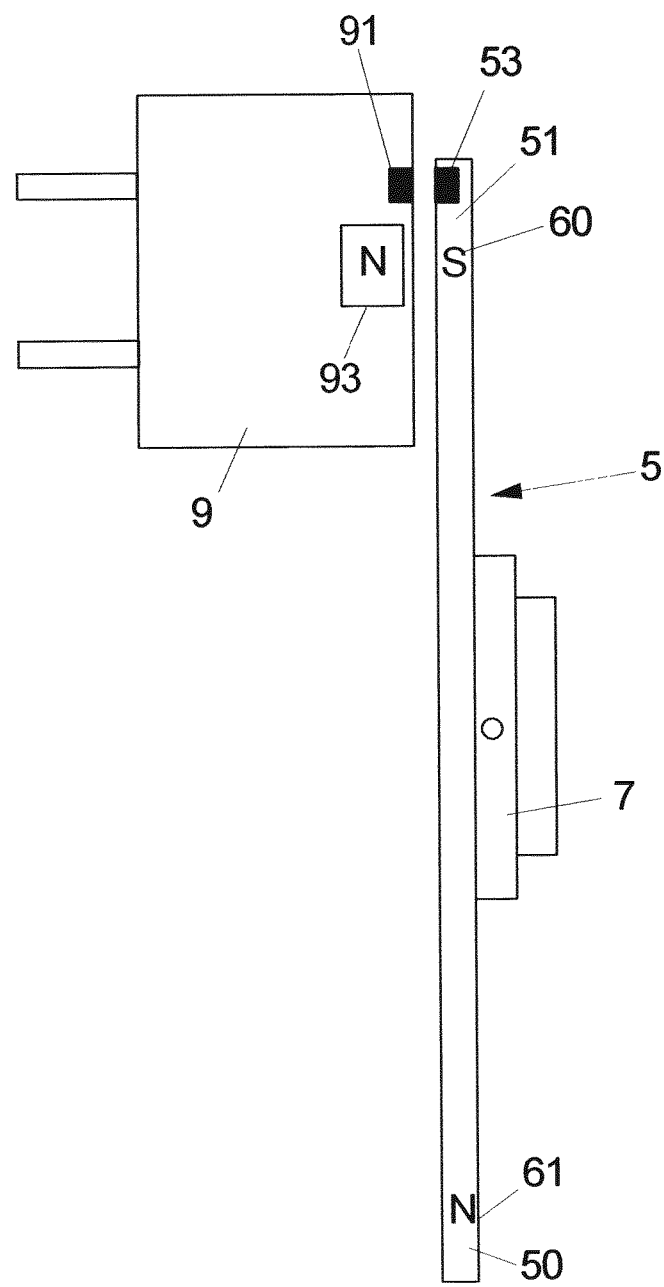
FIG. 19 shows a schematic view of a band device connected to an external electric device in another way.

In another embodiment shown in FIG. 16A, 16B, no blocking element 24 on the base 20 of the first closure member 2 is provided. Accordingly, the locking part 30 of the second closure member 3– in comparison to the previously described embodiment does not have to comprise a support element 303 for preventing the second closure element 3 from becoming jammed in between the blocking element 24 and the locking protrusion 210 when closing the closure device 1. Other than that the embodiment of FIG. 16A, 16B is identical to the previously described embodiment, such that it also shall be referred to the above.

FIG. 17 shows an embodiment of a band device 5 in which on each end 50, 51 at least one electrical contact 52, 53 for establishing electric connection between the two ends 50, 51 is provided. By means of such electrical contacts 52, 53, for example a signal can be generated for indicating whether the band device 5 has been correctly closed.

In this regard, each end 50, 51 may carry a single electrical contact 52, 53 for establishing an electrical connection. It, however, is also possible for example that one end 50, 51 carries two electrical contacts 52, 53, wherein the other end 51, 50 carries a short-circuit element for short-circuiting the electrical contacts 52, 53 of the other end 51, 50 to each other. By detecting whether the electrical contacts 52, 53 are short-circuited or not it can be determined whether the band device has been closed in a correct fashion.

Electrical contacts 52, 53 arranged on one or both ends 50, 51 of the band device 5 may also be used to establish an electrical connection to an external electric device 9 such as a charging device.

A first embodiment of this kind is shown in FIG. 18 in which each end 50, 51 of the band device 5 carries an electrical contact 52, 53. By means of such electrical contacts 52, 53, an electrical connection to electrical contacts 90, 91 of an external electric device 9 can be established to, for example, charge an electronic device 7 such as a watch, a mobile computing device or a mobile phone of the band device 5. Likewise, such electrical contacts 52, 53, 90, 91 can also serve to establish an electric data connection allowing for a data communication between the electronic device 7 and the external electric device 9.

In the embodiment of FIG. 18, each end 50, 51 of the band device 5 comprises a magnetic member 60, 61, and likewise two magnetic members 92, 93 are provided on the external electric device 9. By means of such magnetic members 60, 61, 92, 93, the ends 50, 51 of the band device can be magnetically held on the external electric device 9, wherein by means of such magnetic members 60, 61, 92, 93 the fastening of the band device 5 on the external electric device 9 may be allowed in an easy and comfortable way in that the magnetic members 60, 61, 92, 93 guide the electrical contacts 52, 53, 90, 91 into electrical connection with each other.

In another embodiment of an arrangement of a band device 5 and an external electric device 9 electrical contacts 53 (in that case at least two electrical contacts) are provided on only one end 51 of the band device 5 and, in a state in which the band device 5 is fastened to an external electric device 9, are in electrical connection with electrical contacts 91 of the external electric device 9. By means of magnetic members 60, 93 on the end 51 of the band device 5 and on the external electric device 9, the band device 5 is magnetically held on the external electric device 9, for example, a charging station or the like.

In addition, on the external electric device 9 at least one engagement element and/or an engagement opening of the kind described above may be provided for establishing a mechanic connection to the band device 5 on one or both ends 50, 51.

The electrical contacts 52, 53, 90, 91 may be part of a standardized interface such as a USB interface or the like.

The idea underlying the invention is not limited to the embodiment described above, but may be implemented also in entirely different embodiments.

For example, the magnetic members described herein may form in principle an arbitrary pattern of magnet poles. Such magnetic patterns may be formed by discrete magnet elements arranged in proximity to each other. Alternatively, the magnetic members may also be formed by a magnetized foil or strip.

Preferably, the magnetic members produce a magnetic flux only on one side of the associated end of the band device, preferably the side to be attached to the other end. Such one-sided magnetic flux can for example be produced by a suitable magnetization of a magnetic foil or magnetic strip or by arranging discrete magnet elements in proximity to each other to form a so-called Halbach array. Such one-sided magnetic flux has the advantage that the ends of the band device automatically can be attached to each other on their correct sides, because only on such sides a magnetic flux is present. Also, if the band device is attached to a user's limb, only very limited magnetic flux may reach into human tissue.

LIST OF REFERENCE NUMERALS

1 Closure device
2 Closure member
20 Base
200 Opening
201 Fastening member
21 Locking element
210 Locking protrusion
211 Tilted surface
212 Outer edge of locking protrusion
22 Magnet housing
220 Opening
23 Magnetic member
230 Center
24 Blocking element
3 Closure member
30 Locking part
300 Force application location (line, point)
301 Opening
302 Handle
303 Support element
304 Locking protrusion
305 Opening
306 Tilted face
307 Front face
308 Back face
31 Force application element
310, 311 End
32 Securing element
33 Magnetic member
4 Magnetic field sensor
5 Band device (wristband)
50, 51 End
500 Engagement element
501 Hook section
502 Surface
510, 511, 512 Engagement opening
513 Surface
52, 53 Electrical contact
54 Band section
6 Closure device
60, 61 Magnetic member
600, 610 North pole
601, 611 South pole
7 Electronic device
8 Length adjustment device
9 External electrical device (charger)
90, 91 Electrical contact
92, 93 Magnetic element
C Closing force
E Engagement direction
F Pretensioning force
L Extension direction
O Opening direction
W, W1 Width
X Closing direction
X', X" Tilting movement
Y1, Y2 Opening direction

The invention claimed is:

1. A band device, in particular wristband, which extends longitudinally along an extension direction and at least in sections is formed flexible for placing it around a user's limb, comprising:
   a first end having a first surface
   a second end having a second surface, and
   a closure device for connecting the first end and the second end to each other such that the first end and the second end are held on each other in a closed position of the closure device, wherein in the closed position the first end with its first surface and the second end with its second surface extend along each other,
   wherein the closure device comprises at least one engagement element arranged on the first end and at least one engagement opening arranged on the second end, wherein in the closed position of the closure device the at least one engagement element engages the at least one engagement opening, wherein at least one of the ends comprises a magnetic member comprising at least two magnet poles of opposite polarity, the at least two magnet poles being displaced with respect to each other along the associated first or second surface,
   wherein the magnetic member comprises more than two magnet poles which are displaced with respect to each other along the extension direction of the band device and are arranged to form a periodic sequence of a pattern of alternating magnet poles along a longitudinal length of the band device, and
   wherein the at least one engagement opening is formed as an oblong hole or oblong recess extending longitudinally along the extension direction such that the at least one engagement element is displaceable in the at least one engagement opening along the extension direction.

2. The band device according to claim 1, wherein a first magnetic member is arranged on the first end and a second magnetic member is arranged on the second end, wherein the first magnetic member and the second magnetic member each comprise at least two magnet poles of opposite polarity, the at least two magnet poles being displaced with respect to each other along the associated first or second surface.

3. The band device according to claim 1, wherein the magnetic member is formed by discrete magnets, by magnetized regions of a magnetic strip or magnetic foil.

4. The band device according to claim 1, wherein the magnetic member produces a magnetic field substantially only on the side of the associated first or second end carrying the first or second surface.

5. The band device according to claim 1, wherein the at least one engagement opening extends longitudinally along the extension direction and has an opening width along the extension direction larger than the width of the at least one engagement element such that the at least one engagement element is displaceable in the at least one engagement opening along the extension direction.

6. The band device according to claim 1, wherein the at least one engagement element is displaceable in the at least one engagement opening along the extension direction by at least half the width, preferably by the width, of one of the at least two magnet poles of the first and/or second magnetic member.

7. The band device according to claim 1, wherein a multiplicity of engagement elements are arranged equally spaced along the extension direction on the first end and/or a multiplicity of engagement openings are arranged equally spaced along the extension direction on the second end.

8. The band device according to claim 7, wherein the spacing between two adjacent engagement elements and/or between two adjacent engagement openings along the extension direction equals the periodic width of the magnetic pattern formed by the at least two magnet poles or a multiple of said periodic width.

9. The band device according to claim 1, wherein the at least one engagement element has a pin shape protruding from the first end.

10. The band device according to claim 1, wherein the at least one engagement element comprises a hook section forming an undercut in which the second end engages in the closed position of the closure device.

11. A band device, in particular wristband, which extends longitudinally along an extension direction and at least in sections is formed flexible for placing it around a user's limb, comprising:
  a first end,
  a second end, and
  a closure device for connecting the first end and the second end to each other such that the first end and the second end are held on each other in a closed position of the closure device,
  wherein the closure device comprises
  a first closure member connected to the first end and having a rigid first locking protrusion and
  a second closure member connected to the second end and being attachable to the first closure member such that in the closed position the second closure member is held on the first closure member, the second closure member having a rigid second locking protrusion,
  wherein the second locking protrusion is engageable with the first locking protrusion in an engagement direction and in the closed position engages the first locking protrusion in a positive locking manner, wherein the first closure member comprises a first magnetic member and the second closure member comprises a second magnetic member, the first magnetic member and the second magnetic member being constituted to magnetically attract each other when the second closure member is attached to the first closure member for closing the closure device, and
  wherein the closure device comprises a force application element connected to the second end and pivotably attached to the second closure member at a force application location in the vicinity of the second locking protrusion, the force application element being constituted to introduce a force into the second closure member.

12. The band device according to claim 11, wherein the first closure member comprises a base and a locking element rigidly attached to the base and carrying the first locking protrusion, wherein the second closure member comprises a locking part carrying the second locking protrusion and having a front face which in the closed position faces the locking element of the first closure member.

13. The band device according to claim 12, wherein the locking element with the first locking protrusion arranged thereon and the base forms a U-shaped recess in which the locking part with the second locking protrusion arranged thereon engages in the closed position of the closure device.

14. The band device according to claim 12, wherein the first closure member comprises a blocking element, wherein the blocking element in the closed position faces a back face of the second closure member facing in a direction opposite to the engagement direction, the blocking element being constituted to prevent the second locking protrusion from moving out of its engagement with the first locking protrusion in the direction opposite the engagement direction when the closure device is in its closed position.

15. The band device according to claim 14, wherein the second closure member comprises a support element attached to the locking part and extending, in the direction opposite to the engagement direction, beyond the locking part, the support element being constituted to prevent an abutment of the back face with the blocking element prior to the second locking protrusion engaging the first locking protrusion.

16. An arrangement of an external electric device and a band device, in particular an wristband, with an electronic device arranged thereon, wherein
  the band device extends longitudinally along an extension direction, at least in sections is formed flexible for placing it around a user's limb and comprises at least one magnetic member and at least one electrical contact provided on a first end and at least one magnetic member and at least one electrical contact provided on an opposing, second end, and
  the external electric device comprises at least two magnetic members and at least two electrical contacts,
  in a connected state in which the band device is connected to the external electrical device the electrical contacts of the band device and the electrical contacts of the external electric device are electrically contacted for establishing an electrical connection between the band device and the external electric device, and wherein the magnetic members of the band device and the magnetic members of the external electric device are constituted to interact for guiding the electrical contacts of the band device into contact with the electrical contacts of the external electrical device when connecting the band device to the external electrical device.

17. The arrangement according to claim 16, wherein the band device further comprises a closure device for connecting the first end and the second end to each other such that the first end and the second end are held on each other in a closed position of the closure device, wherein the closure device comprises at least one engagement element arranged on the first end and at least one engagement opening arranged on the second end, wherein in the closed position of the closure device the at least one engagement element engages the at least one engagement opening.

* * * * *